United States Patent
Lord et al.

(10) Patent No.: US 9,882,309 B2
(45) Date of Patent: Jan. 30, 2018

(54) ELECTRICAL CONNECTOR WITH SPRING-BIASED LATCH

(71) Applicant: FCI Americas Technology LLC, Carson City, NV (US)

(72) Inventors: Hung-Wei Lord, Harrisburg, PA (US); David Humbert, Etters, PA (US)

(73) Assignee: FCI Americas Technology LLC, Carson City, NV (US)

( * ) Notice: Subject to any disclaimer, the term of this patent is extended or adjusted under 35 U.S.C. 154(b) by 0 days.

(21) Appl. No.: 15/301,160

(22) PCT Filed: Mar. 12, 2015

(86) PCT No.: PCT/US2015/020093
§ 371 (c)(1),
(2) Date: Sep. 30, 2016

(87) PCT Pub. No.: WO2015/153090
PCT Pub. Date: Oct. 8, 2015

(65) Prior Publication Data
US 2017/0025791 A1    Jan. 26, 2017

Related U.S. Application Data

(60) Provisional application No. 62/087,555, filed on Dec. 4, 2014, provisional application No. 61/973,200, filed on Mar. 31, 2014.

(51) Int. Cl.
*H01R 13/633* (2006.01)
*G02B 6/38* (2006.01)
(Continued)

(52) U.S. Cl.
CPC ......... *H01R 13/6335* (2013.01); *G02B 6/387* (2013.01); *H01R 13/6275* (2013.01); *H01R 13/6582* (2013.01)

(58) Field of Classification Search
CPC ........... H01R 13/6275; H01R 2103/00; H01R 24/64; H01R 13/6335; H01R 13/639;
(Continued)

(56) References Cited

U.S. PATENT DOCUMENTS 6,887,091 B1   5/2005  Wu
7,473,124 B1   1/2009  Briant et al.
(Continued)

OTHER PUBLICATIONS

International Search Report and Written Opinion for International Application No. PCT/US2015/020093 dated May 29, 2015.
(Continued)

*Primary Examiner* — Truc Nguyen
(74) *Attorney, Agent, or Firm* — Wolf, Greenfield & Sacks, P.C.

(57) ABSTRACT

A latch assembly for an electrical connector module is configured to releasably secure an electrically conductive housing to an electrically conductive cage. The electrically conductive housing defines a first end that supports an electrical connector, and a second end opposite the first end. A plurality of electrical cables are mounted to a plurality of electrical contacts of the electrical connector, and the cables can extend out a second end of the electrically conductive housing opposite the first end. The latch assembly is configured to secure the electrically conductive housing to the cage when the electrical connector is mated to a complementary electrical component in the cage. The latch assembly can release the electrically conductive housing from the cage when the electrical connector is to be removed from the complementary electrical component in the cage.

20 Claims, 11 Drawing Sheets

(51) Int. Cl.
*H01R 13/627* (2006.01)
*H01R 13/6582* (2011.01)

(58) Field of Classification Search
CPC .. H01R 13/633; H01R 13/6658; H01R 25/006; H01R 13/6271; H01R 13/6273; H01R 13/652; H01R 24/78; H01R 11/11; H01R 11/12

See application file for complete search history.

(56) References Cited

U.S. PATENT DOCUMENTS

| | | | | | |
|---|---|---|---|---|---|
| 8,523,595 | B2* | 9/2013 | Wu | ............. | H01R 13/633 439/352 |
| 8,545,252 | B2* | 10/2013 | Wang | ............. | H01R 13/6275 439/352 |
| 8,550,832 | B2* | 10/2013 | Regnier | ............. | H01R 4/2429 439/260 |
| 9,291,782 | B2* | 3/2016 | Skepnek | ............. | G02B 6/4201 |
| 2010/0142898 | A1* | 6/2010 | Teo | ............. | H01R 13/6275 385/88 |
| 2012/0190224 | A1* | 7/2012 | Wu | ............. | H01R 13/633 439/157 |
| 2012/0220152 | A1* | 8/2012 | Wu | ............. | H01R 13/6335 439/350 |
| 2013/0115794 | A1* | 5/2013 | Chang | ............. | H01R 13/6335 439/160 |
| 2013/0273766 | A1 | 10/2013 | Lindkamp | | |
| 2013/0280932 | A1 | 10/2013 | Lindkamp | | |
| 2014/0357106 | A1* | 12/2014 | Varshaysky | ............. | H01R 43/26 439/152 |
| 2015/0263453 | A1* | 9/2015 | Wang | ............. | H01R 13/6335 385/76 |

OTHER PUBLICATIONS

International Preliminary Report on Patentability for International Application No. PCT/US2015/020093 dated Oct. 13, 2016.

* cited by examiner

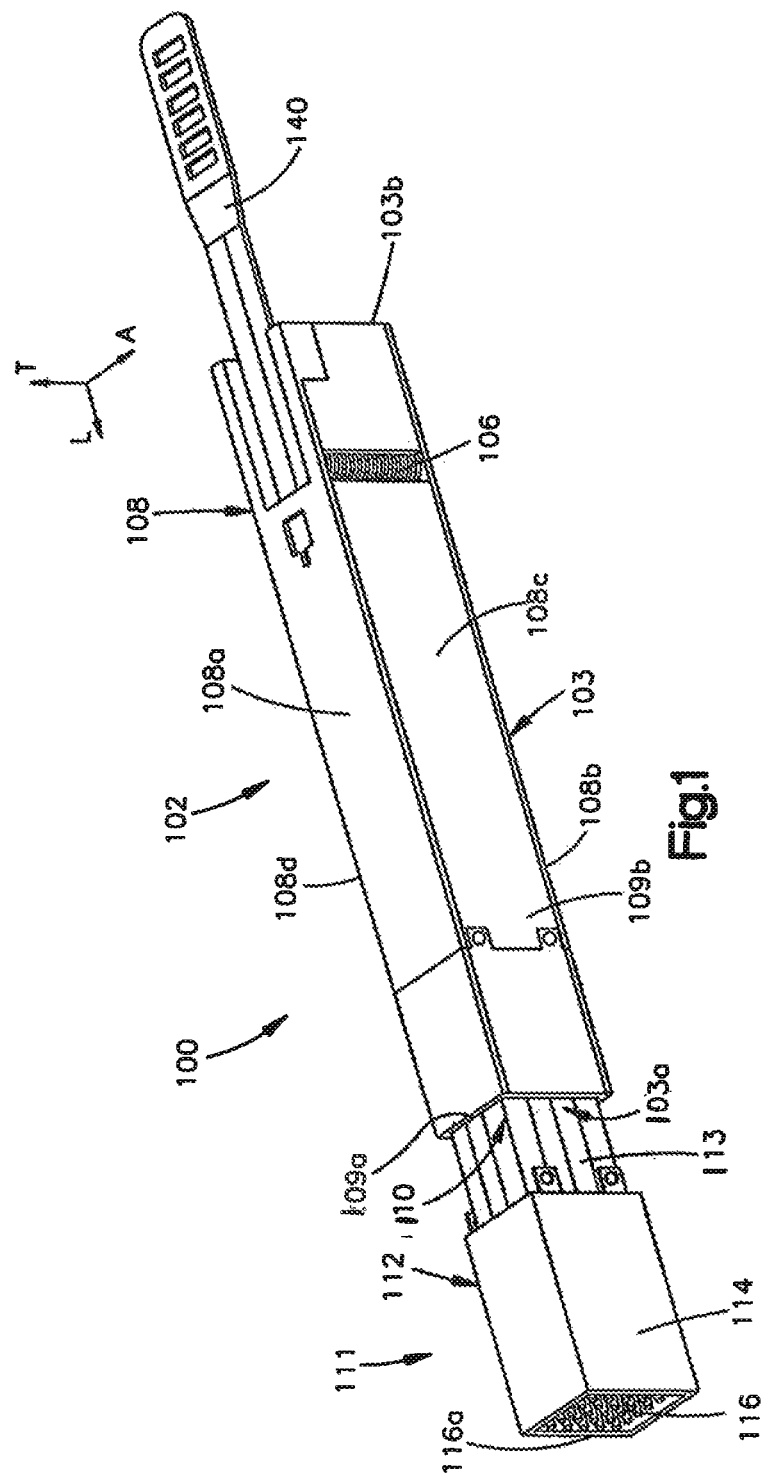

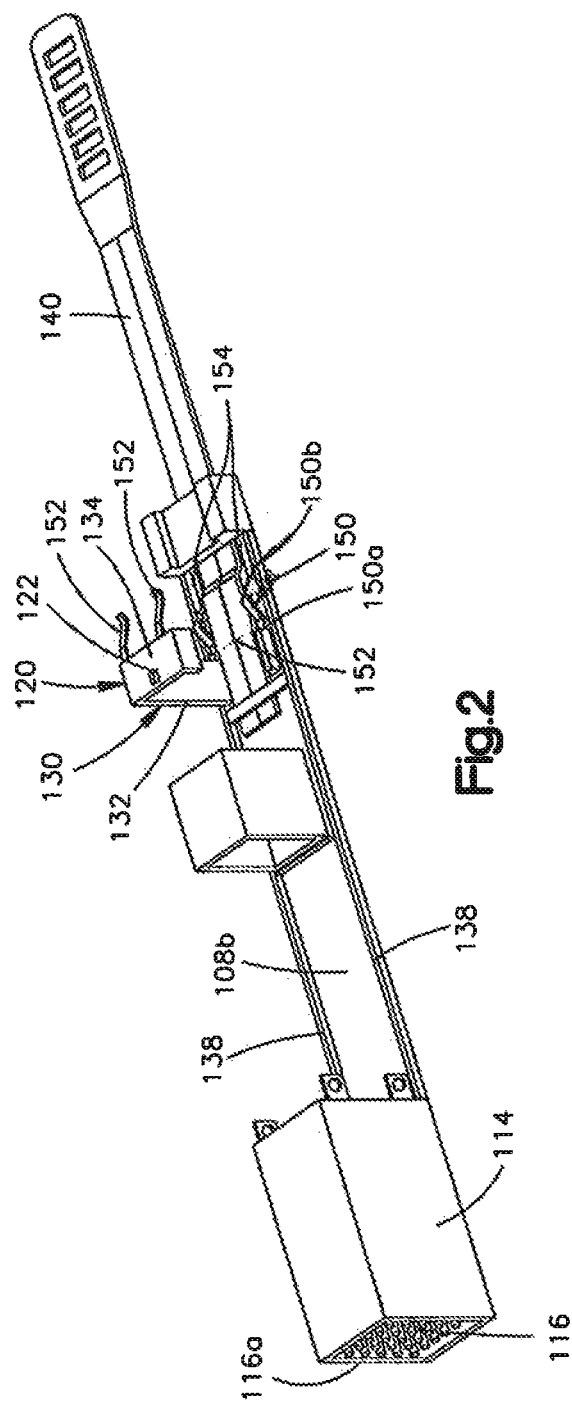

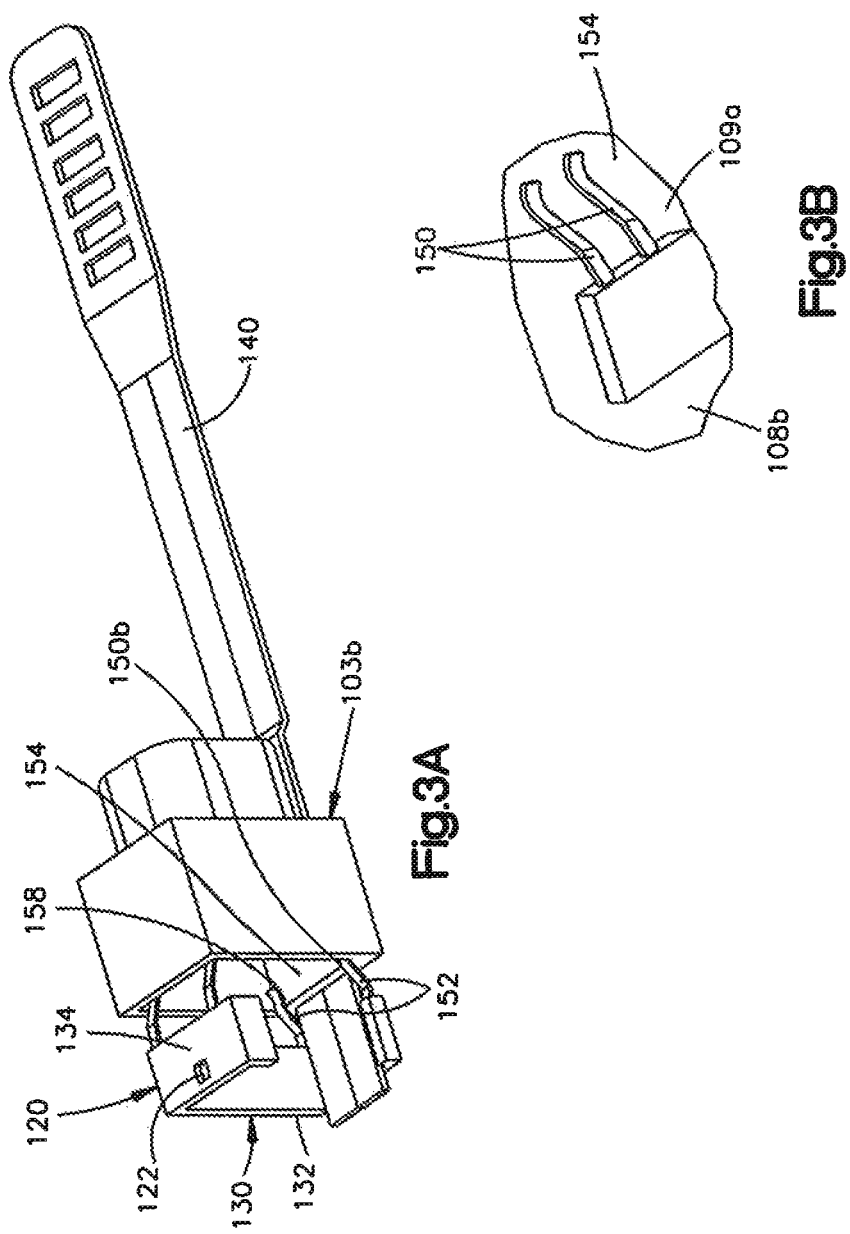

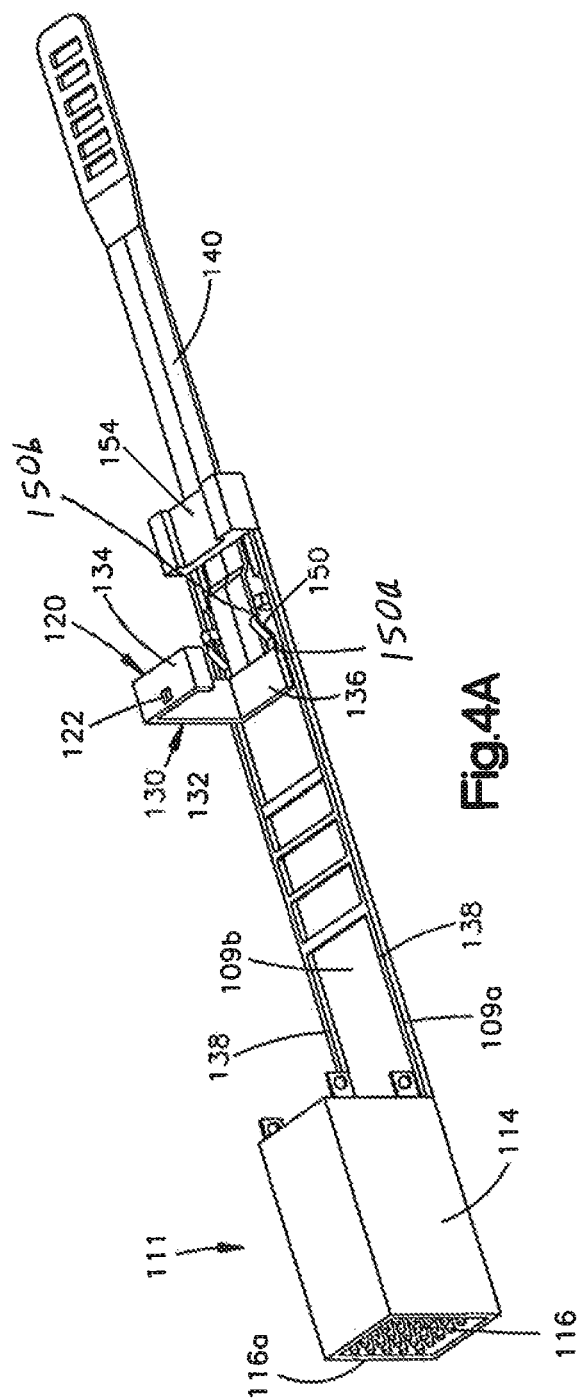

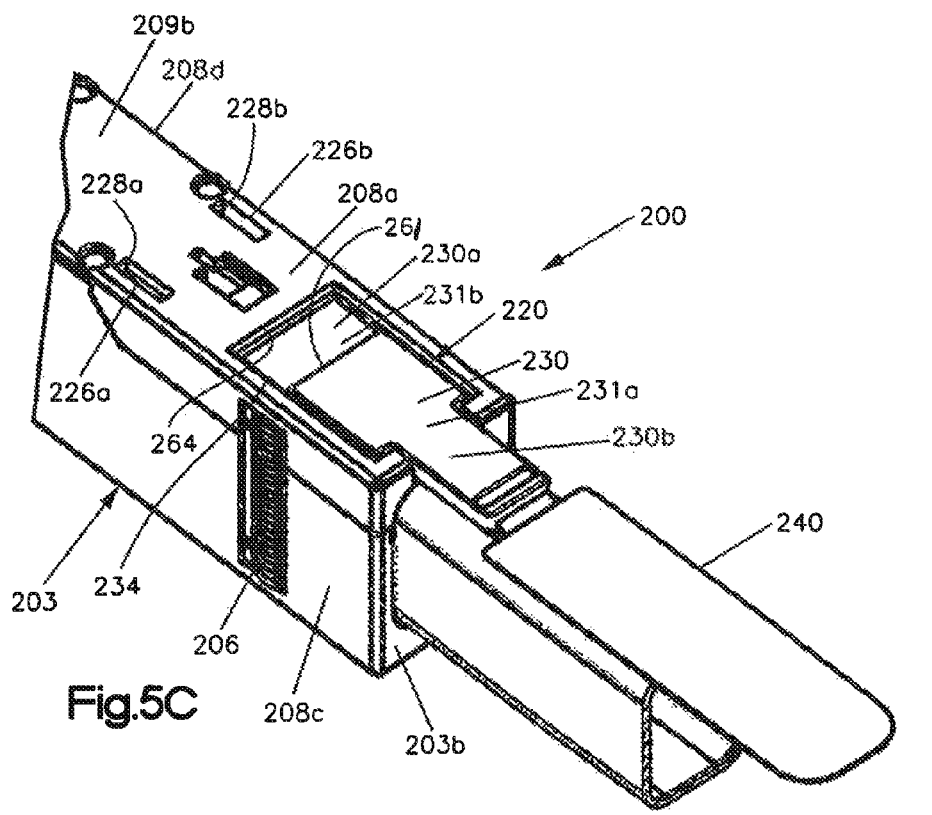
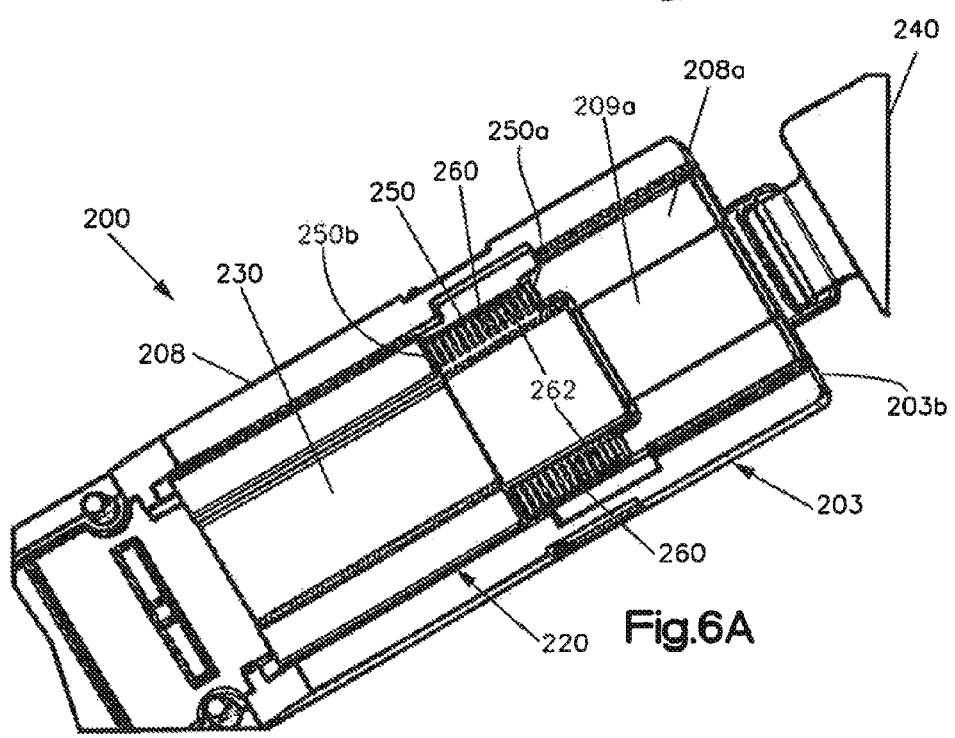

ELECTRICAL CONNECTOR WITH SPRING-BIASED LATCH

RELATED APPLICATIONS

The present application is a U.S. national stage filing under 35 U.S.C. §371 based on International Application No. PCT/US2015/020093, entitled "ELECTRICAL CONNECTOR WITH SPRING-BIASED LATCH", filed Mar. 12, 2015, which claims priority under 35 U.S.C. §119(e) to U.S. Provisional Application Ser. No. 62/087,555, entitled "ELECTRICAL CONNECTOR WITH SPRING-BIASED LATCH", filed Dec. 4, 2014, and to U.S. Provisional Application Ser. No. 61/973,200, entitled "ELECTRICAL CONNECTOR WITH SPRING-BIASED LATCH", filed Mar. 31, 2014, all applications which are hereby incorporated by reference in their entirety for all purposes.

BACKGROUND

Electrical connector systems exist in many forms. In one example, an electrical connector is configured to mate with a complementary electrical component through an electrically conductive shielding cage. The electrically conductive shielding cage provides electromagnetic interference shielding with respect to other electrical components of the system. The electrical connector can be supported by an electrically conductive housing that makes physical and electrical contact with the cage inside the cage when the electrical connector is mated with the complementary electrical component. It is desirable to provide a method and apparatus for securing the electrically conductive housing to the cage when the electrical connector is mated with the complementary electrical component, and to release the electrically conductive housing from the cage when it is desired to remove the electrical connector from the complementary electrical component.

SUMMARY

In accordance with one embodiment, an electrical connector module can include an electrically conductive housing defining a first end and a second end spaced from the first end in a rearward direction, an inner surface that defines a housing interior that extends from the first end to the second end, and an outer surface opposite the inner surface. The housing is configured to support a plurality of electrical conductors proximate to the first end, such that at least one cable mounted to a respective at least one of the plurality of electrical conductors extends through the housing interior and out the second end. The electrical connector module further includes a latch assembly that, in turn, can include 1) at least one latch member movable from a first position to a second position that is displaced with respect to the first position in the rearward direction, 2) at least one spring member having a first end operably coupled to the at least one latch member and a second end that is in abutment with the housing, the at least one spring member providing a spring force that biases the at least one latch member in a forward direction opposite the rearward direction, and 3) a pull tab operably connected to the at least one latch member. The pull tab can extend out the second end in the rearward direction. A force applied to the pull tab in the rearward direction causes the at least one latch member to move from the first position to the second position against the spring force, and removal of the applied force allows the spring force to cause the at least one latch member to translate in the forward direction from the second position to the first position.

BRIEF DESCRIPTION OF THE DRAWINGS

The foregoing summary, as well as the following detailed description of example embodiments of the application, will be better understood when read in conjunction with the appended drawings, in which there is shown in the drawings example embodiments for the purposes of illustration. It should be understood, however, that the application is not limited to the precise arrangements and instrumentalities shown. In the drawings:

FIG. 1 is a perspective view of an electrical connector module constructed in accordance with one embodiment;

FIG. 2 is a perspective view of the electrical connector module illustrated in FIG. 1, constructed in accordance with one embodiment and showing portions removed;

FIG. 3A is a perspective view of a latch assembly of an electrical connector module as illustrated in FIG. 1, but constructed in accordance with another embodiment;

FIG. 3B is a perspective view of the latch assembly illustrated in FIG. 3A, but constructed in accordance with an alternative embodiment;

FIG. 4A is a perspective view of the electrical connector module similar to FIG. 2, but constructed in accordance with an alternative embodiment;

FIG. 5C is a perspective view of the second end of the electrical connector module illustrated in FIG. 5B, showing the latch in a second position spaced from the first position;

FIG. 6A is a bottom plan view of the second end of the electrical connector module illustrated in FIG. 5B, shown with portions removed;

DETAILED DESCRIPTION

Figure 4B:
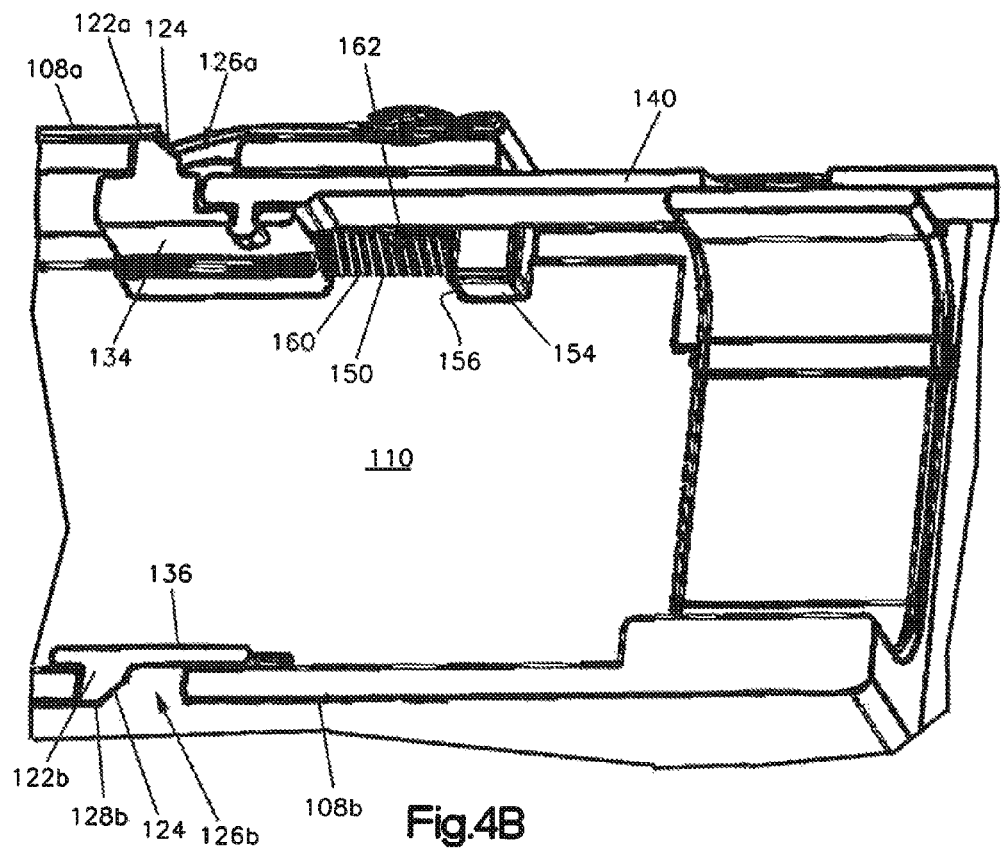
FIG. 4B is a perspective view of a portion of the electrical connector module illustrated in FIG. 4A.

Referring to FIG. 1, an electrical connector module 100 includes an electrically conductive housing 103 that defines a first end 103a and a second end 103b. The first and second ends 103a and 103b can be spaced from each other along a longitudinal direction L. For instance, the first end 103a is spaced from the second end 103b in a forward direction that is along the longitudinal direction L. The second end 103b is spaced from the first end 103a in a rearward direction that is opposite the forward direction and is along the longitudinal direction L. Thus, the first end 103a can be referred to as a front end, and the second end 103b can be referred to as a rear end. The electrical connector module 100 can further include an electrical connector 112 that is supported by the housing 103. For instance, the electrical connector 112 can be supported at the first end 103a of the housing 103. The electrical connector 112 is configured to mate with a complementary electrical component, such as a complementary electrical connector. In particular, the electrical connector module 100 is configured to be inserted in the forward direction into an electromagnetic interference (EMI) shield in the form of a cage extends from the complementary electrical connector. Thus, the electrical connector module 100 can be inserted into the cage and advanced toward the complementary electrical connector until the electrical connector 112 mates with the complementary electrical connector. The electrically conductive housing 103 can contact the cage when the electrical connector 112 is mated with the complementary electrical connector.

The electrical connector module 100 can further include a latch assembly 120 supported by the housing 103. The latch assembly 120 is configured to releasably secure the electrically conductive housing 103 to the cage. The latch assembly 120 is configured to be secured to the cage when the electrical connector module 100 is mated with the complementary electrical connector. In particular, the latch assembly 120 is movable between a first position illustrated in FIG. 1B and a second or disengagement position illustrated in FIG. 1C. When the latch assembly 120 is in the first position, the housing 103 locks to the cage once the electrical connector module 100 has been inserted into the cage a predetermined depth that allows the electrical connector 112 to mate with the complementary electrical connector. When the housing 103 is locked to the cage, the housing 103 is prevented from moving out of the cage along the rearward direction. When the latch assembly 120 is moved to the second position, a latch member 122 of the latch assembly 120 causes the housing 103 to unlock from the cage. Thus, when the latch assembly 120 is in the second position, the connector module 100 is movable in the rearward direction so as to cause the electrical connector 112 to unmate from the complementary electrical connector, and remove the electrical connector module 100 from the cage. In one example, the first position can be spaced from the second position in the forward direction. As will be described in more detail below, the latch assembly 120 is naturally biased to the first position.

The electrically conductive housing 103 can be made from any suitable electrically conductive material. For instance, the electrically conductive housing 103 can be metallic. The electrically conductive housing 103 can be die cast or fabricated in accordance with any suitable alternative embodiment. The housing 103 includes an electrically conductive housing body 108 that can define an inner surface 109a and an outer surface 109b opposite the inner surface 109a. The inner surface 109a can define a housing interior 110. The housing interior 110 extends from the first end 103a to the second end 103b. The housing 103 defines in inward direction from the outer surface 109b toward the inner surface 109a, and thus from the outer surface 109b toward the housing interior 110. The housing 103 further defines in outward direction from the inner surface 109a toward the outer surface 109b, and thus also from the housing interior 110 toward the outer surface 109b. The housing body 108, and thus the housing 103, includes a top wall 108a and a bottom wall 108b opposite the top wall 108a and spaced from the top wall 108a along a transverse direction T that is perpendicular to the longitudinal direction L. The housing body 108, and thus the housing 103, further includes a first side wall 108c and a second side wall 108d opposite the first side wall 108c and spaced from the first side wall 108c along the lateral direction A that is perpendicular to the longitudinal direction L and the transverse direction T. The body 108 can further define the first and second open ends 103a and 103b. The housing body 108 can be a two piece structure, such that the first piece includes the top wall 108a, and the second piece includes the bottom wall 108b. At least one or both of the first and second pieces can further include a portion up to an entirety of one or both of the first and second side walls 108c and 108d.

The housing 103, and thus the electrical connector module 100, can further include at least one resilient member 106 that extends out from the housing body 108 in the outward direction. The resilient member 106 can be electrically conductive so as to be in electrical communication with the housing body 108. When the housing 103 is inserted into the electrically conductive cage, the resilient member 106 can physically contact the electrically conductive cage and place the housing 103 in electrical communication with the cage. The at least one resilient member 106 can extend from any location of the housing body 108 as desired. For instance, the at least one resilient member 106 can extend out from at least one of the first and second side walls 108b and 108c. For instance, the housing 103 can include first and second resilient members 106 that extends from the first and second side walls 108b and 108c, respectively. The resilient members 106 can be configured as springs in accordance with one embodiment.

The electrical connector module 100 can include an electrical connector assembly 111 that includes the electrical connector 112 and at least one cable 113 that extends out from the electrical connector 112. The at least one cable 113 can be configured as desired. For instance, the at least one cable 113 can be an electrically conductive cable or a fiber optic cable. Thus, the at least one cable 113 can be configured to carry data signals. Alternatively or additionally, the at least one cable 113 can be configured as a power cable that is configured to carry electrical power. Alternatively, or additionally, the at least one cable 113 can be configured to carry optical signals. For instance, the at least one cable 113 can be configured as a fiber optic cable. The at least one cable 113 can include an electrical insulator and a conductor disposed in the electrical insulator. The electrical conductor can be a metallic material, such as copper. The electrical connector assembly 111 can include a plurality of electrical cables 113 that extend out from the electrical connector 112 and out the second end 103b. The electrical cables 113 can be organized in a bundle that extends out the second end 103b of the housing 103, or can be alternatively organized as desired. The electrical connector 112 can be supported by the first end 103a of the housing 103. Thus, it can be said that the first end 103a is configured to support the electrical connector 112.

The electrical connector 112 can include a dielectric or electrically insulative connector housing 114, and a plurality of electrical conductors 116 that are supported by the connector housing 114. Accordingly, when the electrical connector 112 is supported by the first end 103a of the housing 103, then the electrical conductors 116 are likewise supported at the front end 103a of the housing 103. It can therefore be said that the housing 103 is configured to support the electrical conductors 116 proximate to the first end 103a. The electrical connector housing 114 can receive the first end 103a of the housing 103 until various attachment structure of the housing 114 is secured to complementary attachment structure of the housing 103. It should be appreciated, of course, that the electrical connector 112 can be supported by the first end 103a of the housing 103 in any suitable alternative embodiment as desired.

The electrical conductors 116 can include mating ends 116a, and mounting ends opposite the mating ends. The mounting ends and the mating ends can be spaced from each other along the longitudinal direction L. Thus, the electrical conductors 116 can be vertical conductors, wherein the mating ends and the mounting ends are oriented substantially parallel to each other. Accordingly, the electrical connector 112 can be referred to as a vertical connector. The mating ends 116a can be configured as receptacles that are configured to receive complementary mating ends of a complementary electrical connector. Alternatively, the mating ends 116a can be configured as headers that are configured to be received by a receptacle defined by complementary mating ends of the complementary electrical connector. Further, the electrical conductors 116 can be right angle conductors, whereby the mating ends are oriented perpendicular to the mounting ends. Similarly, the electrical connector 112 can be configured as a right angle electrical connector that includes right angle conductors.

The electrical cables 113 can extend out with respect to the mounting ends in the rearward direction, and can be in electrical communication with respective ones of the mounting ends. For instance, the cables 113 can be mounted to a respective at least one of the electrical conductors 115. In one example, the electrical cables 113 can be physically and electrically connected to respective ones of the mounting ends. The electrical connector assembly 111 and the electrical connector 112 can be constructed as described in U.S. Patent Application Publication No. 20130273781, published on Oct. 17, 2013, the disclosure of which is hereby incorporated by reference as if set forth in its entirety herein. Thus, the electrical conductors can be arranged in leadframe assemblies that each includes a dielectric or electrically insulative leadframe housing and a respective plurality of the electrical conductors. The mating ends of each of the pluralities of electrical conductors of each leadframe assembly can be arranged in a respective column. The leadframes, and the columns, can be spaced from each other in the lateral direction A. The columns can be arranged in the transverse direction. It should be appreciated, of course, that the electrical connector 112 can be alternatively configured as desired.

Alternatively, the electrical connector 112 can be configured as an optical transceiver, whereby the electrical conductors can be carried by a substrate of a printed circuit board. For instance, the electrical connector module 100 can include one or more printed circuit boards supported by the housing 103 proximate to the first end 103a. The printed circuit boards can be supported in the interior of the housing 103, or alternatively supported as desired. The printed circuit boards can each include a dielectric or electrically insulative material, and a plurality of electrical conductors supported by the electrically insulative material. For instance, the electrical conductors can be configured as electrical traces supported by the electrically insulative material. The cables 113 can be in physical and electrical connection with respective ones of the electrical traces, and bundled together as described above. It should be appreciated that the printed circuit boards are configured to be received by a receptacle that is defined by complementary mating ends of a complementary electrical connector. Thus, it can be said that the electrical connector module 100 includes a plurality of electrical conductors that are supported by the housing 103, for instance at the first end 103a. The electrical conductors 116 can be supported by a dielectric, or electrically insulative material, which can be defined for instance by the electrical connector housing 114, or a substrate of a printed circuit board as described above. The electrically insulative material, in turn, can be supported directly or indirectly by the housing 103 in the housing interior 110.

Referring also to FIGS. 1-4C in general, and as described above, the latch assembly 120 is configured to be secured to the cage when the electrical connector module 100 is mated with the complementary electrical connector. The latch assembly 120 includes at least one latch member 122 that is movable between a first position to a second position that is displaced with respect to the first position in the rearward direction. The latch member 122 is positioned such that the connector module 100 can be configured to be removably secured to the cage when the latch member 122 is in the first position. In one example, the housing 103 can be configured to be removably secured to the cage. In another example, the latch member 122 can be configured to be removably secured to the cage. It should be appreciated, of course that the connector module 100 can be configured to be removably secured to the cage in any manner as desired such that movement of the latch member 122 is from the first position to second position disengages the connector module 100 from the cage. Thus, it can be said that the latch member 122 is configured to remove the securement of the connector module 100 to the cage when the latch member 122 moves to the second position from the first position. As a result, when the latch member 122 is in the second position, the connector module 100 can be translated in the rearward direction with respect to the cage, thereby unmating the electrical connector 112 from the complementary electrical connector. The connector module 100 can further be removed from the cage in the rearward direction.

The at least one latch member 122 can include a first latch member 122a and a second latch member 122b that is spaced from the first latch member 122a along any direction as desired. For instance, the second latch member 122b can be spaced from the first latch member 122a along the transverse direction T. It should be appreciated, however, that the second latch member 122b can alternatively be spaced from the first latch member 122a in the lateral direction A, as will be appreciated from the description below. Each of the first and second latch members 122a and 122b can define a respective ramp surface 124 that extends along the inward direction as it extends in the rearward direction. The housing 103 defines a first aperture 126a that extends through the housing body 108 from the outer surface 109b to the inner surface 109a. The first latch member 122a, and in particular the ramp surface 124 of the first latch member 122a, can extend into the first aperture 126a at least during a portion of the travel between the first position and the second position. For instance, the ramp surface 124 of the first latch member 122a can be disposed in the first aperture 126a, and can move in the rearward direction in the first aperture 126a, as the first latch member 122a moves toward the second position. In one example, the ramp surface 144 of the first latch member 122a can be disposed in the first aperture 126a when the first latch member 122a is in the first position.

The housing 103 can include a first wall 128a that faces in the rearward direction. The first wall 128a can define a forwardmost boundary of at least a portion of the first aperture 126a, or can otherwise be aligned with the first aperture 126a along a plane that extends along the outer surface of the housing wall through which the first aperture 126a extends. Thus, the first wall 128a can be aligned with the first aperture 126a along a plane that is defined by the longitudinal direction L and the lateral direction A. At least a portion up to an entirety of the first latch member 122a can be disposed behind the first wall 128a at least during a portion of the travel between the first position and the second position. For instance, the first latch member 122a can be disposed behind the first wall 128a as the first latch member 122a moves toward the second position from the first position. Alternatively or additionally, the first latch member 122a can be disposed behind the first wall 128a when the latch member 122 is in the first position. It is appreciated that the term "behind" and derivatives thereof is used herein to refer to a spatial relationship in the rearward direction. The term "in front of" and derivatives refers to a spatial relationship with respect to the forward direction. At least a portion up to an entirety of the ramp surface can be disposed behind the first wall 128a when the first latch member 122a is in the second position. Thus, the ramp surface 124 of the first latch member 122a can be disposed in front of the first wall 128a when the first latch member 122a is in the first position. At least a portion of the ramp surface 124 of the first latch member 122a can be brought into alignment with the first aperture 126a along the transverse direction T when the first latch member 122a is moved from the first position to the second position. For instance, an entirety of the ramp surface 124 of the first latch member 122a can be aligned with the first aperture 126a along the transverse direction T when the first latch member 122a is in the second position.

The electrical connector module 100 can be constructed such that the first latch member 122a does not extend outward beyond the outer surface of the housing wall through which the first aperture 126a extends. Thus, the electrical connector module can be constructed such that the first latch member 122a does not extend outward beyond the outer surface 109b with respect to the outward direction. In one example, the first aperture 126a can extend through the top wall 108a. Thus, in one example, the first latch member 122a does not extend outward beyond the outer surface 109b of the top wall 108a with respect to the transverse direction T. Thus, it can be said that the electrical connector module 100 can be configured such that the first latch member 122a does not intersect a plane that extends along the outer surface 109b of the housing 103 and across the first aperture 126a. Accordingly, the first latch member 122a can be constructed such that the forward most end of the ramp surface 124 of the first latch member 122a does not intersect the plane at any location when the first latch 122 is at any location from and between the first position and the second position.

The housing 103 defines a second aperture 126b that extends through the housing body 108 from the outer surface 109b to the inner surface 109a. The second aperture 126b can be spaced from the first aperture 126a along any direction as desired. For instance, the second aperture 126b can be spaced from the first aperture 126a along the transverse direction T. Alternatively, as will be appreciated from the description below, the first and second apertures 126a and 126b can be spaced from each other along the lateral direction A. Thus in one example, the first aperture 126a can extend through the top wall 108a of the housing, and the second aperture 126b can extend through the bottom wall 108b of the housing 103. The second latch member 122b, and in particular the ramp surface 124 of the second latch member 122b, can extend into the second aperture 126b at least during a portion of the travel between the first position and the second position. For instance, the ramp surface 124 of the second latch member 122b can be disposed in the second aperture 126b, and can move in the rearward direction in the second aperture 126b, as the second latch member 122b moves toward the second position. In one example, the ramp surface 144 of the second latch member 122b can be disposed in the second aperture 126b when the second latch member 122b is in the first position.

The housing 103 can include a second wall 128b that faces in the rearward direction. The second wall 128b can define a forwardmost boundary of at least a portion of the second aperture 126b, or can otherwise be aligned with the second aperture 126b along a plane that extends along the outer surface of the housing wall through which the second aperture 126b extends. Thus, the second wall 128b can be aligned with the second aperture 126 along a plane that is defined by the longitudinal direction L and the lateral direction A. At least a portion up to an entirety of the second latch member 122b can be disposed behind the second wall 128b at least during a portion of the travel between the first position and the second position. For instance, the second latch member 122b can be disposed behind the second wall 128b as the second latch member 122b moves toward the second position from the first position. Alternatively or additionally, the second latch member 122b can be disposed behind the second wall 128b when the latch member 122 is in the first position. Thus, the ramp surface 124 of the second latch member 122b can be disposed in front of the second wall 128b when the first latch member 122a is in the first position. At least a portion up to an entirety of the ramp surface of the second latch member 122b can be disposed behind the second wall 128b when the second latch member 122b is in the second position. Thus, the ramp surface 124 of the second latch member 122b can be disposed in front of the second wall 128b when the second latch member 122b is in the first position. At least a portion of the ramp surface 124 of the second latch member 122b can be brought into alignment with the second aperture 126b along the transverse direction T when the second latch member 122b is moved from the first position to the second position. For instance, an entirety of the ramp surface 124 of the second latch member 122b can be aligned with the second aperture 126b along the transverse direction T when the second latch member 122b is in the second position.

The electrical connector module 100 can be constructed such that the second latch member 122b does not extend outward beyond the outer surface of the housing wall through which the second aperture 126b extends. Thus, the electrical connector module 100 can be constructed such that the second latch member 122b does not extend outward beyond the outer surface 109b with respect to the outward direction. In one example, the second aperture 126b can extend through the bottom wall 108b. Thus, in one example, the second latch member 122b does not extend outward beyond the outer surface 109b of the bottom wall 108b with respect to the transverse direction T. It can therefore be said that the electrical connector module 100 can be configured such that the second latch member 122b does not intersect a plane that extends along the outer surface 109b of the housing 103 and across the second aperture 126b. Accordingly, the second latch member 122b can be constructed such that the forward most end of the ramp surface 124 of the second latch member 122b does not intersect the plane at any location when the second latch 122 is at any location from and between the first position and the second position.

The first latch member 122a can be coupled to the second latch member 122b, such that movement of one of the first and second latch members 122a and 122b in the longitudinal direction L causes the other of the first and second latch members 122a and 122b to move in the longitudinal direction L. For instance, the latch assembly 120 can include a latch body 130, such that both the first and second latch members 122a and 122b can project from the latch body 130 toward the wall of the housing body 108 that defines the first and second apertures 126a and 126b, respectively. The latch body 130 can includes a support wall 132, and a first arm 134 that extends out from the support wall 132 in the inward direction along the lateral direction A. The latch body 130 can further include a second arm 136 that extends out from the support wall 132 in the inward direction along the lateral direction A. The first and second arms 134 and 136 can face each other along the transverse direction T. The first and second arms 134 and 136 can extend along the inner surface 109b of opposed walls of the housing 103. The opposed walls of the housing 103 can be defined by the top wall 108a and bottom wall 108l).

The latch body 130, the first and second latch members 122a and 122b, the support wall 132, and the first and second arms 134 and 136 can all be monolithic with each other. Alternatively, one or more of the latch body 130, the first and second latch members 122a and 122b, the support wall 132, and the first and second arms 134 and 136 can be attached to each other in any manner as desired. The first and second arms 134 and 136 can be spaced from each other along the transverse direction T, and can be cantilevered from the support wall 132. The first latch member 122a can project from the first arm 134 toward the housing body 108, for instance toward the top wall 108a. The second latch member 122b can project from the second arm 136 toward the housing body, for instance toward the bottom wall 108b. The at least one cable 113 can extend between the first and second arms 134 and 136 with respect to the transverse direction T. Thus, the at least one cable 113 can extend between the first and second latch members 122a and 122b with respect to the transverse direction T. It can further be said that the latch body 130 at least partially surrounds the at least one cable 113, for instance on three sides as defined by the support wall 132 and the first and second arms 134 and 136.

It should be appreciated that at least a portion of the latch body 130, for instance at least one up to all of the first and second arms 134 and 136, and the support wall 132, can ride along the inner surface 109a of the housing body 108 as the latch members 122a and 122b move from the first position to the second position. For instance, the latch body 130 can ride along at least one rail 138 of the housing 103 along the longitudinal direction L. For instance, the first latch arm 134 can ride along at least one rail 138. For instance, a portion of the latch body 130 can overlap with a portion of the respective at least one rail 138 in the transverse direction T so as to secure the latch body 130 to the respective at least one rail 138. In one example, the first latch arm 134 can ride between a pair of rails 138 that are spaced from each other along the lateral direction A, and extend inwardly from the inner surface 109a of the wall of the housing 103 that defines the first aperture 126a. Thus, the pair of rails 138 can extend inwardly from the inner surface 109a of the top wall 108a. The second latch arm 136 can ride along at least one rail 138. In one example, the second latch arm 136 can ride between a pair of rails 138 that are spaced from each other along the lateral direction A, and extend inwardly from the inner surface 109a of the wall of the housing 103 that defines the second aperture 126b. Thus, the pair of rails 138 can extend inwardly from the inner surface 109a of the bottom wall 108b. The rails 138 can be monolithic with the housing body 108, or can be attached to the housing body 108 as desired.

The electrical connector 112 can further include a pull tab 140 that is operably connected to the at least one latch member, such that movement of the pull tab 140 in the rearward direction causes the at least one latch member to move in the rearward direction. The pull tab 140 can be attached to the latch body 130. Alternatively, the pull tab 140 can be monolithic with the latch body 130. The pull tab 140 can define a depth along the transverse direction T and a width along the lateral direction A that is greater than the depth. The pull tab 140 can be operably connected to both the first and second latch members 122a and 122b. The pull tab 140 can extend out the second open end 103b and define a grip surface that can be easily gripped such that a pull force in the rearward direction can be applied to the pull tab 140 that biases the pull tab 140 to move in the rearward direction. The pull tab 140 can extend out from one of the first and second arms 134 and 136. For instance, the pull tab 140 can be snap fit into the respective one of the first and second arms 134 and 136. The electrical connector 112 can include any number of pull tabs 140 as desired. For instance, a first pull tab 140 can extend from the first arm 134. A second pull tab 140 can extend from the second arm 136 as desired, such that the at least one cable 113 is disposed between the first and second pull tabs 140.

The electrical connector 112 further includes at least one spring member 150 that extends between the at least one latch member 122 and the housing 103. The latch member has a first end 150a operably coupled to the at least one latch member 122 and a second end 150b that is in abutment with the housing 103. For instance, the at least one spring member 150 can be monolithic with the latch body 130. Alternatively, the at least one spring member 150 can have a first end 150a in abutment with the at least one latch body 130 and, second end 150b opposite the first end 150a and in abutment with the housing 103. The at least one spring member 150 can be attached to the latch body 130 in any manner as desired. Further, the at least one spring member 150 can be monolithic with the housing 103 or attached to the housing 103 in any manner desired. The spring member 150 is configured to apply a spring force that urges the at least one latch member 122 to move in the forward direction. Accordingly, a force applied to the pull tab 140 in the rearward direction causes the at least one latch member 122 to move from the first position to the second position against the spring force, and removal of the applied force causes the spring force to bias the at least one latch member 122 from the second position to the first position.

The housing 103 can defines at least one spring support block 154 that extends into the housing interior 110 from the inner surface 109b. The second end 150b of the spring member 150 can be in abutment with the spring support block 154. Thus, the second end 150b of the spring member 150 can be in abutment with the housing 103. The at least one spring member 150 can include at least one spring member that extends from the first arm 134 of the latch body 130, and at least one spring member that extends from the second arm 136 of the latch body 130. For instance, the at least one spring member 150 can include a first plurality and second plurality of spring members 150 that extend from the first arm 134 and the second arm 136, respectively. Thus, the electrical connector 112 can include any number of spring members 150, configured in any manner desired.

For instance, referring to FIGS. 2-3B, the at least one spring member 150 can be configured as a spring finger 152 that extends out from the latch body 130. The spring finger 152 can be monolithic with the latch body 130, or can be attached to the latch body 130 in any manner desired. The spring finger 152 can be bent along the transverse direction T as it extends between the latch body 130 and the support block 154. In one example, the spring finger 152 can be bent in the inward direction as it extends between the latch body 130 and the support block 154. In another example, the spring finger 152 can be bent in the outward direction as it extends between the latch body 130 and the support block 154.

As illustrated in FIG. 2, the housing 103 can include a first at least one spring finger 152 that extends from the first arm 134, and a second at least one spring finger 152 that extends from the second arm 136. The first at least one spring finger 152 can include first and second spring fingers 152 spaced from each other along the lateral direction A, each extending from the first arm 134 to a support block 154, which can be a common support block 154 or respective first and second respective support blocks 154. The first and second spring fingers 152 can be disposed on opposed sides of a centerline of the first arm 134 and that extends in the longitudinal direction L. The first and second spring fingers 152 that extend from the first arm 134 can be equidistantly spaced from the centerline.

The first and second at least one spring lingers 152 can include a plurality of spring fingers 152, which can include any number of spring fingers as desired. As illustrated in FIGS. 3A-B, the first at least one spring finger 152 can include first and second pairs of spring fingers 152. The first and second pairs can be spaced from each other along the transverse direction. The spring fingers 152 of each respective pair can be spaced from each other along the lateral direction A. The spring fingers 152 of the first pair can include first and second spring fingers 152 that extend from the first arm 134 to a support block 154, which can be a common support block 154 or respective first and second respective support blocks 154. The first and second spring fingers 152 of the first pair can be disposed on opposed sides of a centerline of the first arm 134 that extends in the longitudinal direction L. The first and second spring fingers 152 of the first pair can be equidistantly spaced from the centerline.

Similarly, the second at least one spring finger 152 can include third and fourth spring fingers 152 spaced from each other along the lateral direction A, each extending from the second arm 136 to a support block 154, which can be a common support block 154 or respective first and second respective support blocks 154. The third and fourth spring fingers 152 can be disposed on opposed sides of a centerline of the second arm 136 and that extends in the longitudinal direction L. The third and fourth spring fingers 152 can be equidistantly spaced from the centerline.

As illustrated in FIG. 3B, the second at least one spring finger 152 can include third and fourth pairs of spring fingers 152 spaced from each other along the lateral direction A, each extending from the second arm 134 to a support block 154, which can be a common support block 154 or respective first and second respective support blocks 154. The third and fourth pairs of spring fingers 152 can be disposed on opposed sides of a centerline of the second arm 136 that extends in the longitudinal direction L. The third and fourth pairs of spring fingers 152 can be equidistantly spaced from the centerline. Thus, the second at least one spring finger 152 can include a plurality of spring fingers 152, which can include any number of spring fingers as desired. The fist at least one spring finger 152 can be disposed proximate to the top wall 108*a*, and the second at least one spring finger 152 can be disposed proximate to the bottom wall 108*b*. The pull tab 140 can extend between and can be aligned with first and second spring fingers 152 that are spaced from each other along the lateral direction A and aligned with each other along the lateral direction.

As illustrated in FIG. 2, each support block 154 can define an external abutment surface 156, and the second end 150*b* of the spring member 150 can abuts the external abutment surface 156. For instance, the second end 150*b* of the spring finger 152 can be bent in the transverse direction T so as to make surface contact with the external abutment surface. Alternatively, as illustrated in FIGS. 3A-3B, the second end 150*b* of the spring members 150 can extend into a slot 158 defined by the support block 154. The slot 158 can extend into the support block 154 along a direction toward the outer surface of the corresponding wall of the housing 103. Thus, the second end 150*b* can be in abutment with at least one internal surface of the spring support block 154 that at least partially defines the slot 158. During operation, as the latch members 122 move in the rearward direction, the spring lingers 152 are compressed, thereby increasing the bend of the spring fingers 152, which causes the spring force defined by the spring fingers 152 to increase against the latch body 130 in the forward direction.

Figure 4C:
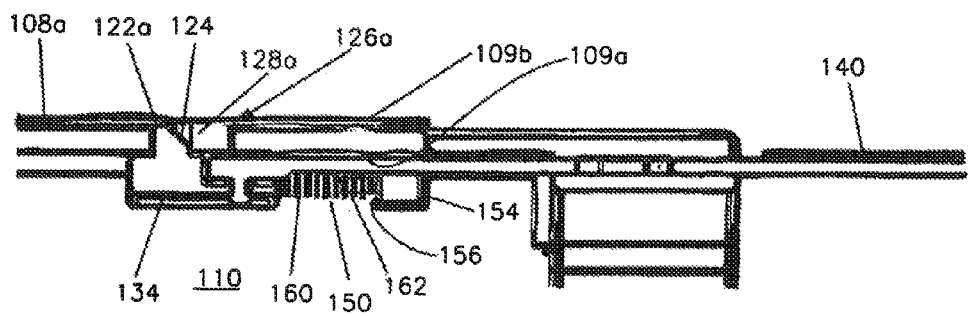
FIG. 4C is a perspective view of a portion of the electrical connector module illustrated in FIG. 4B, constructed in accordance with an alternative embodiment.

Alternatively, as illustrated in FIGS. 4A-4C, the at least one spring member 150 can be configured as a coil spring 160 that extends from the latch body 130 to the support block 154. For instance, the coil spring 160 can extends from the first arm 134 to the support block. The at least one spring member 150 can further include a second coil spring 160 that extends from the second arm 136 to a second support block 154 spaced from the first support block along the transverse direction T. For instance, the housing 103 can include a support post 162 that extends from the external abutment surface 156 in the forward direction, and the coil spring 160 can receive the support post 162 at the second end 150*b*. During operation, as the latch members 122 move in the rearward direction, the at least one coil spring 160 is compressed, thereby causing the spring force defined by the coil spring 160 to increase against the latch body 130 in the forward direction.

Figure 5A:
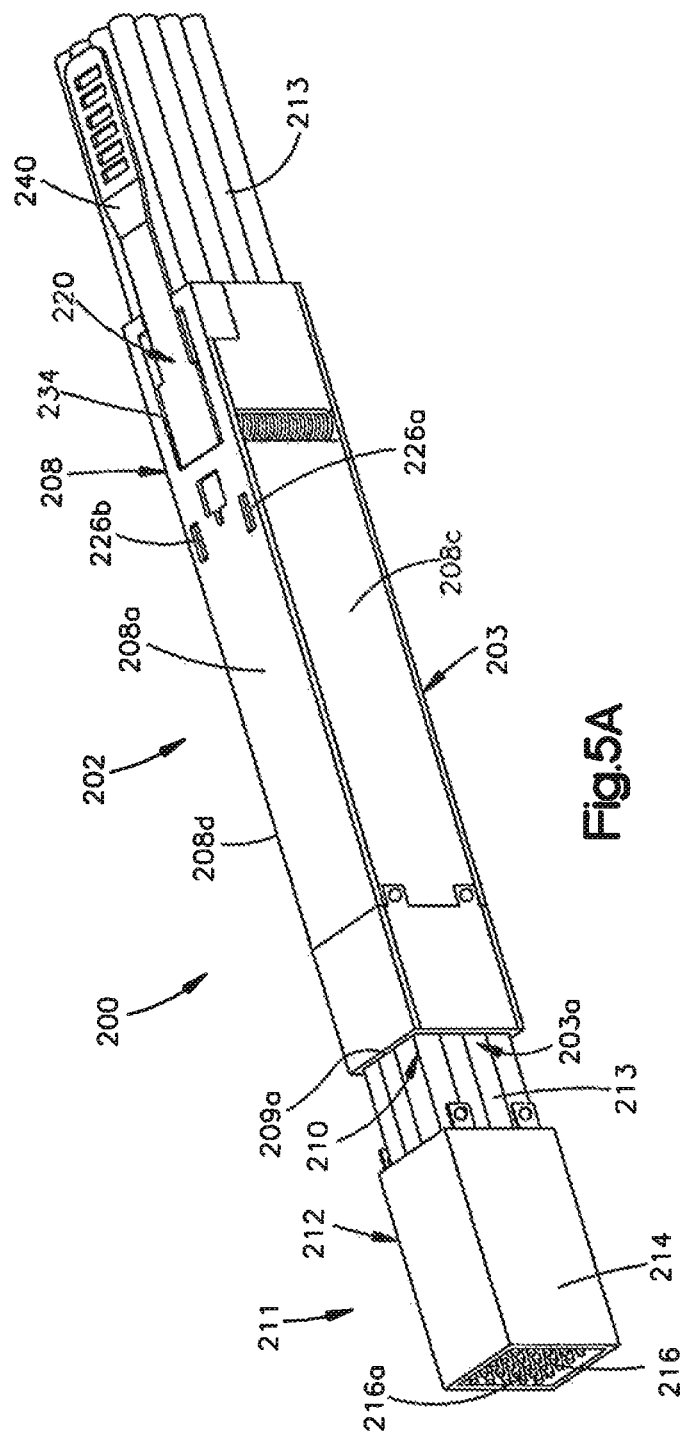
FIG. 5A is a perspective view of an electrical connector module constructed in accordance with another embodiment.
Figure 5B:
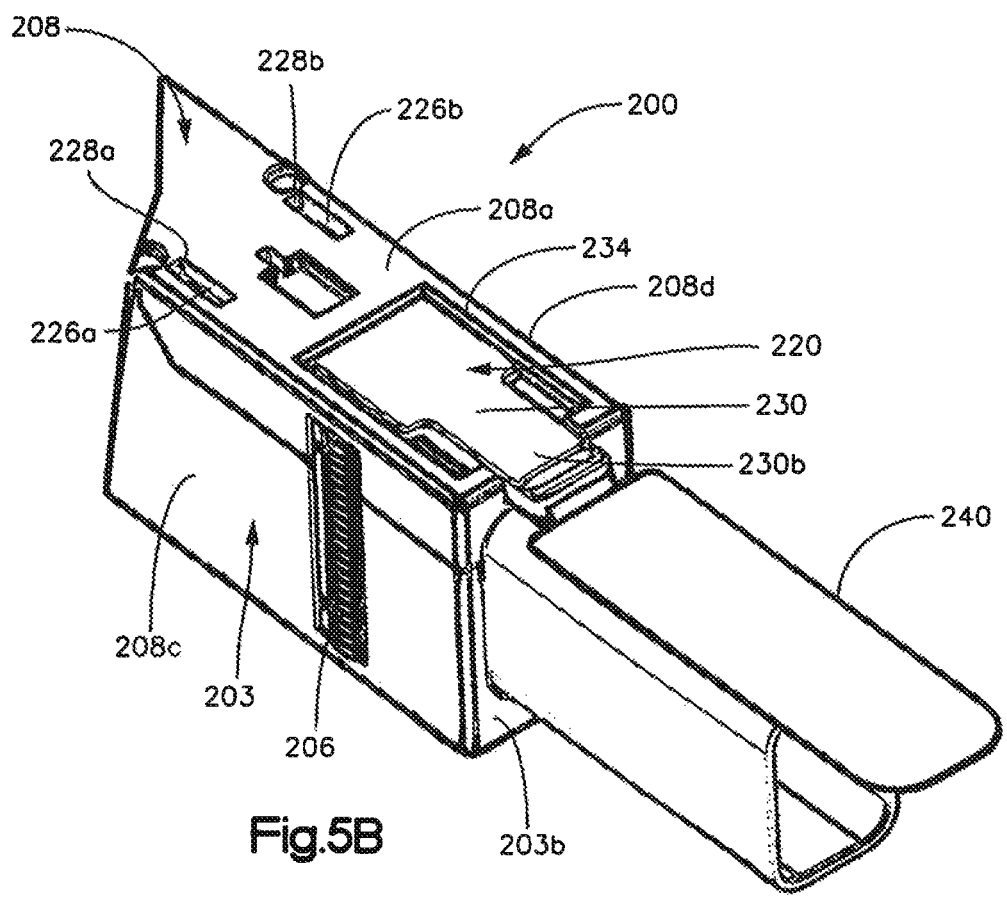
FIG. 5B is a perspective view of a second end of the electrical connector module illustrated in FIG. 5A, showing a latch of the electrical connector module in a first position.
Figure 6B:
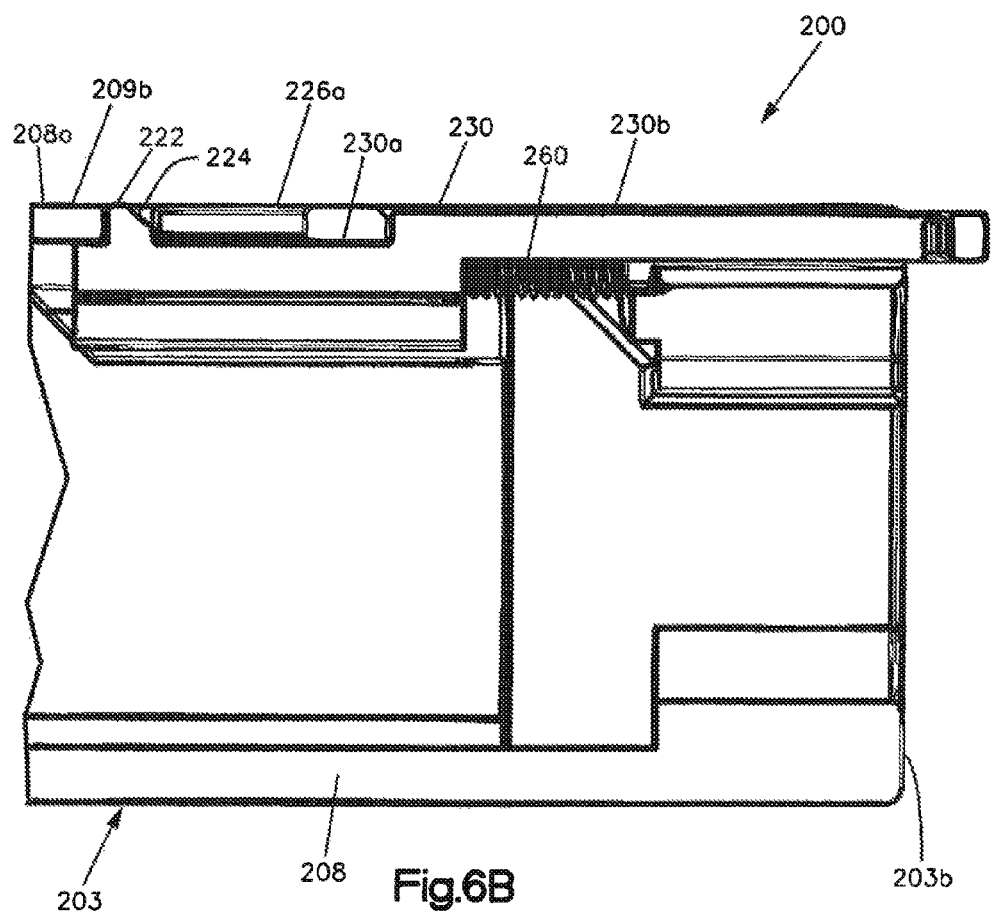
FIG. 6B is a sectional side elevation view of the second end of the electrical module illustrated in FIG. 6A, shown with portions removed.
Figure 7A:
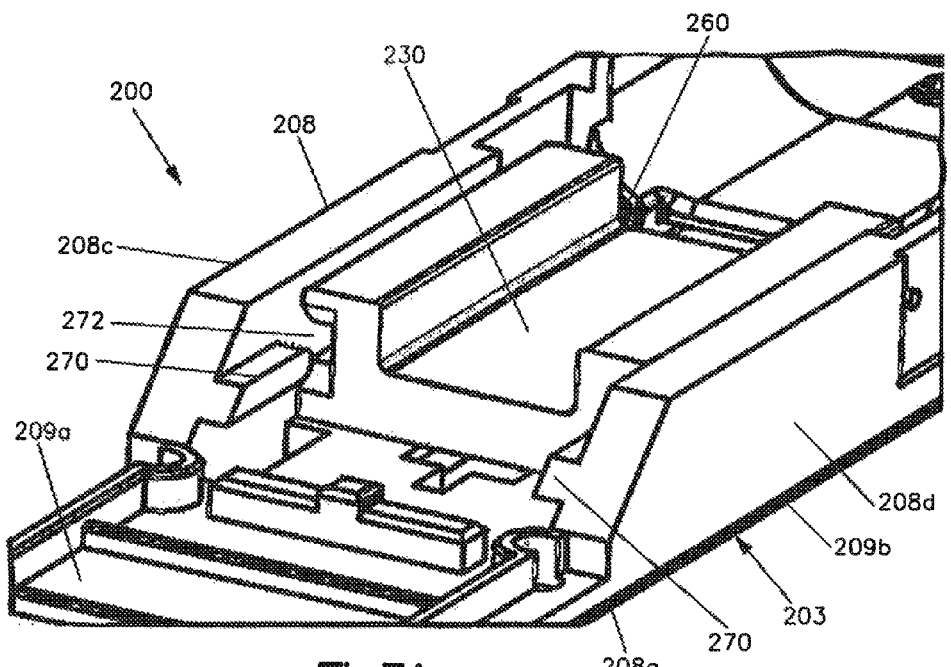
FIG. 7A is a perspective view of the second end of the electrical connector module illustrated in FIG. 5C, shown with portions removed.
Figure 7B:
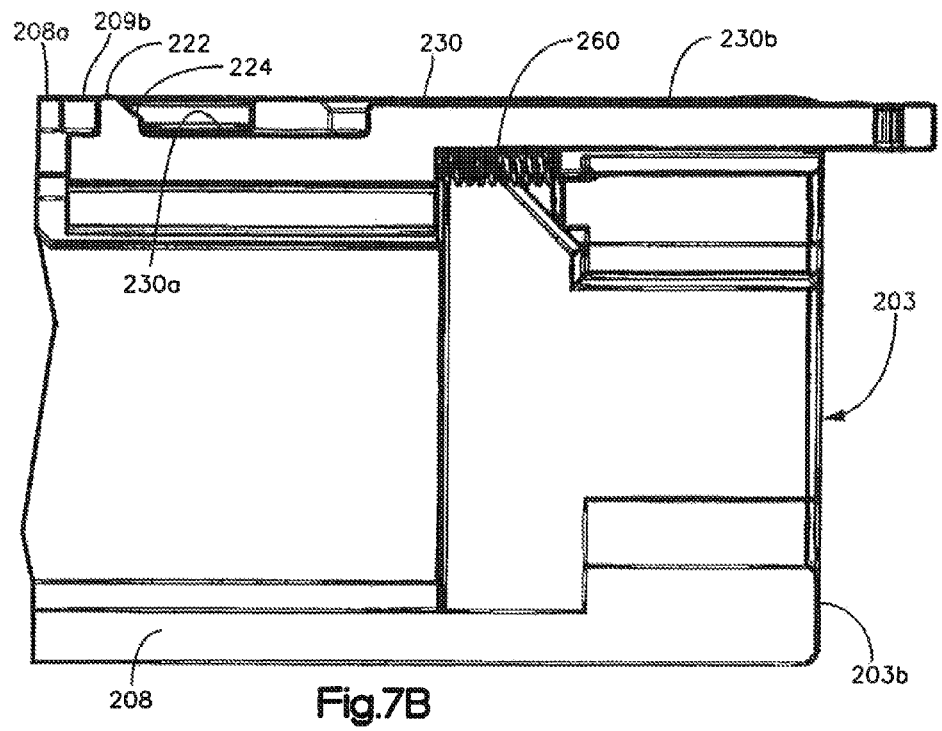
FIG. 7B is a sectional side elevation view of the second end of the electrical connector module illustrated in FIG. 5C.
Figure 7C:
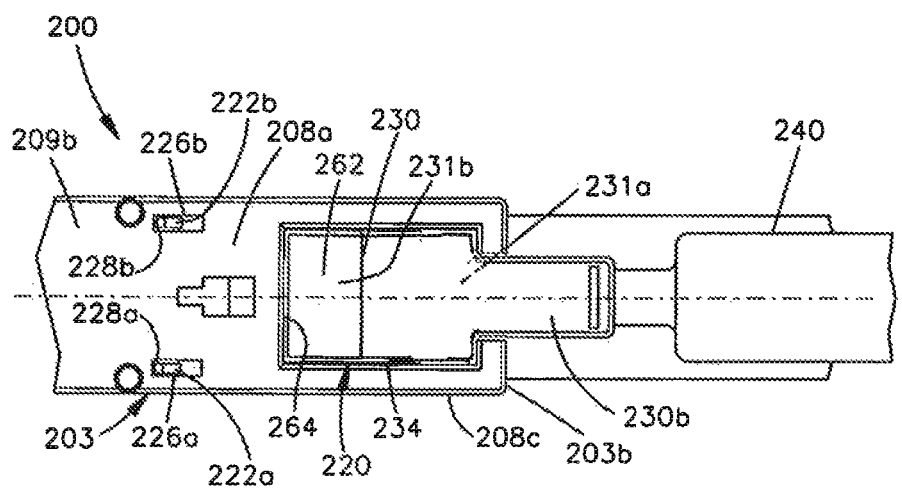
FIG. 7C is a top plan view of a portion of the electrical connector module as illustrated in FIG. 1C.
Figure 8:
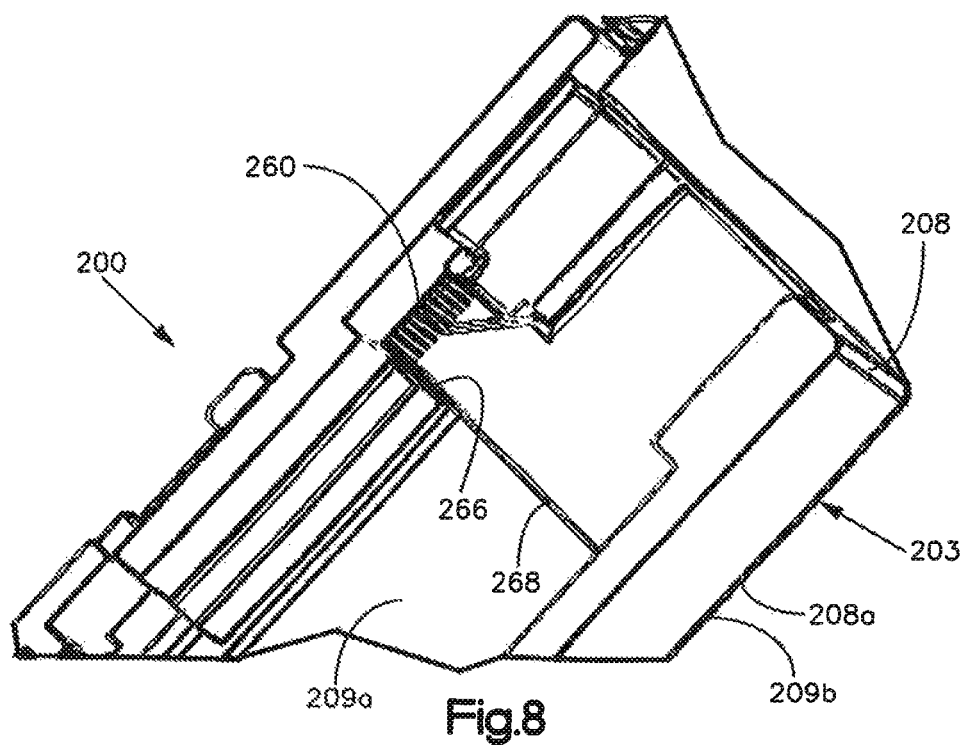
FIG. 8 is a sectional perspective view of a portion of the electrical connector module, showing the latch between the first position and the second position.

Referring now to FIGS. 5A-5C, an electrical connector module 200 constructed in accordance with another embodiment includes an electrically conductive housing 203 that defines a first end 203*a* and a second end 203*b*. The first and second ends 203*a* and 203*b* can be spaced from each other along a longitudinal direction L. For instance, the first end 203*a* is spaced from the second end 203*b* in a forward direction that is along the longitudinal direction L. The second end 203*b* is spaced from the first end 203*a* in a rearward direction that is opposite the forward direction and is along the longitudinal direction L. Thus, the first end 203*a* can be referred to as a front end, and the second end 203*b* can be referred to as a rear end. The electrical connector module 200 can further include an electrical connector 212 that is supported by the housing 203. For instance, the electrical connector 212 can be supported at the first end 203*a* of the housing 203. The electrical connector 212 is configured to mate with a complementary electrical component, such as a complementary electrical connector. In particular, the electrical connector module 200 is configured to be inserted in the forward direction into an electromagnetic interference (EMI) shield in the form of a cage extends from the complementary electrical connector. Thus, the electrical connector module 200 can be inserted into the cage and advanced toward the complementary electrical connector until the electrical connector 212 mates with the complementary electrical connector. The electrically conductive housing 203 can contact the cage when the electrical connector 212 is mated with the complementary electrical connector.

The electrical connector module 200 can further include a latch assembly 220 supported by the housing 203. The latch assembly 220 is configured to releasably secure the electrically conductive housing 203 to the cage. The latch assembly 220 is configured to be secured to the cage when the electrical connector module 200 is mated with the complementary electrical connector. In particular, the latch assembly 220 is movable between a first position illustrated in FIG. 5B and a second position illustrated in FIG. 5C. When the latch assembly 220 is in the first position, the housing 203 locks to the cage once the electrical connector module 200 has been inserted into the cage a predetermined depth that allows the electrical connector 212 to mate with the complementary electrical connector. When the housing 203 is locked to the cage, the housing 203 is prevented from moving out of the cage along the rearward direction. When the latch assembly 220 is moved to the second position, a latch member 222 of the latch assembly 220 causes the housing 203 to unlock from the cage. Thus, when the latch assembly 220 is in the second position, the connector module 200 is movable in the rearward direction so as to cause the electrical connector 212 to unmate from the complementary electrical connector, and remove the electrical connector module 200 from the cage. In one example, the first position can be spaced from the second position in the forward direction. As will be described in more detail below, the latch assembly 220 is naturally biased to the first position.

The electrically conductive housing 203 can be made from any suitable electrically conductive material. For instance, the electrically conductive housing 203 can be metallic. The electrically conductive housing 203 can be die cast or fabricated in accordance with any suitable alternative embodiment. The housing 203 includes an electrically conductive housing body 208 that can define an inner surface 209a and an outer surface 209b opposite the inner surface 209a. The inner surface 209a can define a housing interior 210. The housing interior 210 extends from the first end 203a to the second end 203b. The housing 203 defines in inward direction from the outer surface 209b toward the inner surface 209a, and thus from the outer surface 209b toward the housing interior 210. The housing 203 further defines in outward direction from the inner surface 209a toward the outer surface 209b, and thus also from the housing interior 210 toward the outer surface 209b. The housing body 208, and thus the housing 203, includes a top wall 208a and a bottom wall 208b opposite the top wall 208a and spaced from the top wall 208a along a transverse direction T that is perpendicular to the longitudinal direction L. The housing body 208, and thus the housing 203, further includes a first side wall 208c and a second side wall 208d opposite the first side wall 208c and spaced from the first side wall 208c along the lateral direction A that is perpendicular to the longitudinal direction L and the transverse direction T. The body 208 can further define the first and second open ends 203a and 203b. The housing body 208 can be a two piece structure, such that the first piece includes the top wall 208a, and the second piece includes the bottom wall 208b. At least one or both of the first and second pieces can further include a portion up to an entirety of one or both of the first and second side walls 208c and 208d.

The housing 203, and thus the electrical connector module 200, can further include at least one resilient member 206 that extends out from the housing body 208 in the outward direction. The resilient member 206 can be electrically conductive so as to be in electrical communication with the housing body 208. When the housing 203 is inserted into the electrically conductive cage, the resilient member 206 can physically contact the electrically conductive cage and place the housing 203 in electrical communication with the cage. The at least one resilient member 206 can extend from any location of the housing body 208 as desired. For instance, the at least one resilient member 206 can extend out from at least one of the first and second side walls 208b and 208e. For instance, the housing 203 can include first and second resilient members 206 that extends from the first and second side walls 208b and 208c, respectively. The resilient members 206 can be configured as springs in accordance with one embodiment.

The electrical connector module 200 can include an electrical connector assembly 211 that includes the electrical connector 212 and at least one cable 213 that extends out from the electrical connector 212. The at least one cable 213 can be configured as desired. For instance, the at least one cable 213 can be an electrically conductive cable or a fiber optic cable. Thus, the at least one cable 213 can be configured to carry electrical signals. Alternatively or additionally, the at least one cable 213 can be configured as a power cable that is configured to carry electrical power. Alternatively, or additionally, the at least one cable 213 can be configured to carry optical signals. For instance, the at least one cable 213 can be configured as a fiber optic cable. The at least one cable 213 can include an electrical insulator and a conductor disposed in the electrical insulator. The electrical conductor can be a metallic material, such as copper. The electrical connector assembly 211 can include a plurality of electrical cables 213 that extend out from the electrical connector 212 and out the second end 203b. The electrical cables 213 can be organized in a bundle that extends out the second end 203b of the housing 203, or can be alternatively organized as desired. The electrical connector 212 can be supported by the first end 203a of the housing 203. Thus, it can be said that the first end 203a is configured to support the electrical connector 212.

The electrical connector 212 can include a dielectric or electrically insulative connector housing 214, and a plurality of electrical conductors 216 that are supported by the connector housing 214. Accordingly, when the electrical connector 212 is supported by the first end 203a of the housing 203, then the electrical conductors 216 are likewise supported at the front end 203a of the housing 203. It can therefore be said that the housing 203 is configured to support the electrical conductors 216 proximate to the first end 203a. The electrical connector housing 214 can receive the first end 203a of the housing 203 until various attachment structure of the housing 214 is secured to complementary attachment structure of the housing 203. It should be appreciated, of course, that the electrical connector 212 can be supported by the first end 203a of the housing 203 in any suitable alternative embodiment as desired.

The electrical conductors 216 can include mating ends 216a, and mounting ends opposite the mating ends. The mounting ends and the mating ends can be spaced from each other along the longitudinal direction L. Thus, the electrical conductors 216 can be vertical conductors, wherein the mating ends and the mounting ends are oriented substantially parallel to each other. Accordingly, the electrical connector 212 can be referred to as a vertical connector. The mating ends 216a can be configured as receptacles that are configured to receive complementary mating ends of a complementary electrical connector. Alternatively, the mating ends 216a can be configured as headers that are configured to be received by a receptacle defined by complementary mating ends of the complementary electrical connector. Further, the electrical conductors 216 can be right angle conductors, whereby the mating ends are oriented perpendicular to the mounting ends. Similarly, the electrical connector 212 can be configured as aright angle electrical connector that includes right angle conductors.

The electrical cables 213 can extend out with respect to the mounting ends in the rearward direction, and can be in electrical communication with respective ones of the mounting ends. For instance, the cables 113 can be mounted to a respective at least one of the electrical conductors 115. In one example, the electrical cables 213 can be physically and electrically connected to respective ones of the mounting ends. The electrical connector assembly 211 and the electrical connector 212 can be constructed as described in U.S. Patent Application Publication No. 20130273781, published on Oct. 17, 2013 U.S. the disclosure of which is hereby incorporated by reference as if set forth in its entirety herein. Thus, the electrical conductors can be arranged in leadframe assemblies that each includes a dielectric or electrically insulative leadframe housing and a respective plurality of the electrical conductors. The mating ends of each of the pluralities of electrical conductors of each leadframe assembly can be arranged in a respective column. The leadframes, and the columns, can be spaced from each other in the lateral direction A. The columns can be arranged in the transverse direction. It should be appreciated, of course, that the electrical connector 212 can be alternatively configured as desired.

Alternatively, the electrical connector 212 can be configured as an optical transceiver, whereby the electrical conductors can be carried by a substrate of a printed circuit board. For instance, the electrical connector module 200 can include one or more printed circuit boards supported by the housing 203 proximate to the first end 203a. The printed circuit boards can be supported in the interior of the housing 203, or alternatively supported as desired. The printed circuit boards can each include a dielectric or electrically insulative material, and a plurality of electrical conductors supported by the electrically insulative material. For instance, the electrical conductors can be configured as electrical traces supported by the electrically insulative material. The cables 213 can be in physical and electrical connection with respective ones of the electrical traces, and bundled together as described above. It should be appreciated that the printed circuit boards are configured to be received by a receptacle that is defined by complementary mating ends of a complementary electrical connector. Thus, it can be said that the electrical connector module 200 includes a plurality of electrical conductors that are supported by the housing 203, for instance at the first end 203a. The electrical conductors 216 can be supported by a dielectric, or electrically insulative material, which can be defined for instance by the electrical connector housing 214, or a substrate of a printed circuit board as described above. The electrically insulative material, in turn, can be supported directly or indirectly by the housing 203 in the housing interior 210.

Referring also to FIGS. 6A-8, the electrical connector module 200 further includes a latch assembly 220 that is configured to be secured to the cage when the electrical connector module 200 is mated with the complementary electrical connector. The latch assembly 220 includes at least one latch member 222 that is movable between a first position to a second position that is displaced with respect to the first position in the rearward direction. The latch member 222 is positioned such that the connector module 200 can be removably secured to the cage when the latch member 222 is in the first position. In one example, the housing 203 is configured to be removably secured to the cage. In another example, the latch member 222 is configured to be removably secured to the cage. It should be appreciated, of course that the connector module 100 can be configured to be removable secured to the cage in any manner as desired such that movement of the latch member 222 from the first position to the second position disengages the connector module 100 from the cage. Thus, when the latch member 222 is in the second position, the connector module 200 can be translated in the rearward direction with respect to the cage, thereby unmating the electrical connector 212 from the complementary electrical connector. The connector module 200 can further be removed from the cage in the rearward direction.

The at least one latch member 222 can include a first latch member 222a and a second latch member 222b that is spaced from the first latch member 222a. The second latch member 222b can be spaced from the first latch member 222a in the lateral direction A. The first and second latch members 222a and 222b can extend along a common one of the walls of the housing 203. The common one of the walls of the housing 203 can be defined by the top wall 208a. It should be appreciated, however, that the second latch member 222b can alternatively be spaced from the first latch member 222a in the transverse direction T. Each of the first and second latch members 222a and 222b can define a respective ramp surface 224 that extends along the inward direction as it extends in the rearward direction. The housing 203 defines a first aperture 226a that extends through the housing body 208 from the outer surface 209b to the inner surface 209a. The first latch member 222a, and in particular the ramp surface 224 of the first latch member 222a, can extend into the first aperture 226a at least during a portion of the travel between the first position and the second position. For instance, the ramp surface 224 of the first latch member 222a can be disposed in the first aperture 226a, and can move in the rearward direction in the first aperture 226a, as the first latch member 222a moves toward the second position. In one example, the ramp surface 224 of the first latch member 222a can be disposed in the first aperture 226a when the first latch member 222a is in the first position.

The housing 203 can include a first wall 228a that faces in the rearward direction. The first wall 228a can define a forwardmost boundary of at least a portion of the first aperture 226a, or can otherwise be aligned with the first aperture 226a along a plane that extends along the outer surface of the housing wall through which the first aperture 226a extends. Thus, the first wall 228a can be aligned with the first aperture 226a along a plane that is defined by the longitudinal direction L and the lateral direction A. At least a portion up to an entirety of the first latch member 222a can be disposed behind the first wall 228a at least during a portion of the travel between the first position and the second position. For instance, the first latch member 222a can be disposed behind the first wall 228a as the first latch member 222a moves toward the second position from the first position. Alternatively or additionally, the first latch member 222a can be disposed behind the first wall 228a when the latch member 222 is in the first position. It is appreciated that the term "behind" and derivatives thereof is used herein to refer to a spatial relationship in the rearward direction. The term "in front of" and derivatives refers to a spatial relationship with respect to the forward direction. At least a portion up to an entirety of the ramp surface can be disposed behind the first wall 228a when the first latch member 222a is in the second position. Thus, the ramp surface 224 of the first latch member 222a can be disposed in front of the first wall 228a when the first latch member 222a is in the first position. At least a portion of the ramp surface 224 of the first latch member 222a can be brought into alignment with the first aperture 226a along the transverse direction T when the first latch member 222a is moved from the first position to the second position. For instance, an entirety of the ramp surface 224 of the first latch member 222a can be aligned with the first aperture 226a along the transverse direction T when the first latch member 222a is in the second position.

The electrical connector module 200 can be constructed such that the first latch member 222a does not extend outward beyond the outer surface of the housing wall through which the first aperture 226a extends. Thus, the electrical connector module can be constructed such that the first latch member 222a does not extend outward beyond the outer surface 209b with respect to the outward direction. In one example, the first aperture 226a can extend through the top wall 208a. Thus, in one example, the first latch member 222a does not extend outward beyond the outer surface 209b of the top wall 208a with respect to the transverse direction T. Thus, it can be said that the electrical connector module 200 can be configured such that the first latch member 222a does not intersect a plane that extends along the outer surface 209b of the housing 203 and across the first aperture 226a. Accordingly, the first latch member 222a can be constructed such that the forward most end of the ramp surface 224 of the first latch member 222a does not intersect the plane at any location when the first latch 222 is at any location from and between the first position and the second position.

The housing 203 defines a second aperture 226b that extends through the housing body 208 from the outer surface 209b to the inner surface 209a. The second aperture 226b can be spaced from the first aperture 226a in any direction as desired. For instance, the second aperture 226b can be spaced from the first aperture 226a in the lateral direction A. Thus, both the first and second apertures 226a and 226b can extend through a common one of the walls of the housing 203. The common one of the walls of the housing 203 can be defined by the top wall 208a of the housing 203. The second latch member 222b, and in particular the ramp surface 224 of the second latch member 222b, can extend into the second aperture 226b at least during a portion of the travel between the first position and the second position. For instance, the ramp surface 224 of the second latch member 222b can be disposed in the second aperture 226b, and can move in the rearward direction in the second aperture 226b, as the second latch member 222b moves toward the second position. In one example, the ramp surface 224 of the second latch member 222b can be disposed in the second aperture 226b when the second latch member 222b is in the first position.

The housing 203 can include a second wall 228b that faces in the rearward direction. The second wall 228b can define a forwardmost boundary of at least a portion of the second aperture 226b, or can otherwise be aligned with the second aperture 226b along a plane that extends along the outer surface of the housing wall through which the second aperture 226b extends. Thus, the second wall 228b can be aligned with the second aperture 226 along a plane that is defined by the longitudinal direction L and the lateral direction A. At least a portion up to an entirety of the second latch member 222b can be disposed behind the second wall 228b at least during a portion of the travel between the first position and the second position. For instance, the second latch member 222b can be disposed behind the second wall 228b as the second latch member 222b moves toward the second position from the first position. Alternatively or additionally, the second latch member 222b can be disposed behind the second wall 228b when the latch member 222 is in the first position. Thus, the ramp surface 224 of the second latch member 222b can be disposed in front of the second wall 228b when the first latch member 222a is in the first position. At least a portion up to an entirety of the ramp surface of the second latch member 222b can be disposed behind the second wall 228b when the first latch member 222a is in the second position. Thus, the ramp surface 224 of the second latch member 222b can be disposed in front of the second wall 228b when the second latch member 222b is in the first position. At least a portion of the ramp surface 224 of the second latch member 222b can be brought into alignment with the second aperture 226b along the transverse direction T when the second latch member 222b is moved from the first position to the second position. For instance, an entirety of the ramp surface 224 of the second latch member 222b can be aligned with the second aperture 226b along the transverse direction T when the second latch member 222b is in the second position.

The electrical connector module 200 can be constructed such that the second latch member 222b does not extend outward beyond the outer surface of the housing wall through which the second aperture 226b extends. Thus, the electrical connector module 200 can be constructed such that the second latch member 222b does not extend outward beyond the outer surface 209b with respect to the outward direction. In one example, the second aperture 226b can extend through the top wall 208a. Thus, in one example, the second latch member 222b does not extend outward beyond the outer surface 209b of the top wall 208a with respect to the transverse direction T. Thus, it can be said that the electrical connector module 200 can be configured such that the second latch member 222b does not intersect a plane that extends along the outer surface 209b of the housing 203 and across the second aperture 226b. Accordingly, the second latch member 222b can be constructed such that the forward most end of the ramp surface 224 of the second latch member 222b does not intersect the plane at any location when the second latch 222 is at any location from and between the first position and the second position.

The first latch member 222a can be coupled to the second latch member 222b, such that movement of one of the first and second latch members 222a and 222b in the longitudinal direction L causes the other of the first and second latch members 222a and 222b simultaneously move in the longitudinal direction L. For instance, the latch assembly 220 can include a latch body 230, such that both the first and second latch members 222a and 222b can project from the latch body 230 toward the housing body 208, for instance toward the top wall 208a. At least a portion of the latch body 230 can be disposed in a window 234 that extends through the housing body 208. For instance, the window 234 can extend through the top wall 208a in the transverse direction T. The pull tab can extend out from a portion of the latch body 230 whereby the latch body 230 is substantially flush with the outer surface 209b of the housing body 208. For instance, an outer surface 231a of the latch body 230 can be flush with the outer surface 209b of the housing body 208. For instance, the outer surface 231a can be flush with the outer surface 209b of the housing body 208, or can be disposed between the inner surface 209a and the outer surface 209b of the housing body 208. Thus, the outer surface 231a can be referred to as a substantially flush outer surface. The at least one cable 213 can extend into the housing 203 at a location between the latch body 230 and a wall of the housing 203 that is opposite the wall that defines the apertures 226a and 226b. Thus, the at least one cable 213 can extend into the housing 203 at a location between the latch body 230 and the bottom wall 208b with respect to the transverse direction T. In one example, the first and second latch members 222 and 222b and the latch body 230 can be monolithic with each other. Alternatively, one or more up to all of the first and second latch members 222a and 222b and the latch body 230 can be attached to each other using any attachment method as desired.

The electrical connector module 200 further includes at least one spring member 250 that extends between the at least one latch member 222 and the housing 103. The latch member has a first end 250a is operably coupled between the at least one latch member 222 and the housing 203. In one example, the at least one spring member 250 can be monolithic with the latch body 230. Alternatively, the at least one spring member 250 can have a first end 250a in abutment with the latch body 230 and, second end 250b opposite the first end 250a and in abutment with the housing 203. For instance, the first end 250a can be attached to the latch body 230. Further, the at least one spring member 250 can be monolithic with the housing 203 or attached to the housing 203. The spring member 250 is configured to apply a spring force that urges the at least one latch member 222 to move in the forward direction. Accordingly, a force applied to the at least one latch member 222 in the rearward direction causes the at least one latch member 222 to move from the first position to the second position against the spring force, and removal of the applied force causes the spring three to bias the latch assembly 220 in a direction from the second position to the first position. The at least one spring member 250 can apply the spring force to any location of the latch body 230 as desired. In one example, the at least one spring member 250 can include first and second spring members 250. For instance, a first one of the spring members 250 can be aligned with the first latch member 222a, and the second one of the spring members 250 can be aligned with the second latch member 222b.

The at least one spring member 250 can be configured as at least one coil spring 260 that extends from the latch body 230 to the housing 203. The at least one spring member 250 can further include a first coil spring 260 and a second coil spring 260. For instance, the housing 203 can include a support post 262 that extends in the forward direction, and the coil spring 260 can receive the support post 262 so as to secure the coil springs 260 to the housing 203. The first coil spring 260 can be aligned with the first latch member 222a, and the second coil spring 260 can be aligned with the second latch member 222b. During operation, as the latch members 222-b move in the rearward direction from the first position toward the second position, the coil springs 260 are compressed, thereby causing the spring force defined by the coil spring 260 to increase against the latch body 230 in the forward direction. It should be appreciated, of course, that the electrical connector module 200 can include any number of spring members 250, configured in any manner desired.

The latch assembly 220, and thus the electrical connector module 200, can further include a pull tab 240 that is operably coupled to the latch body 230, such that movement of the pull tab 240 in the rearward direction causes the latch body, and thus the at least one latch member, to move in the rearward direction. In this regard, it should be appreciated that the pull tab 240 can be said to be operably coupled to both the first and second latch members 222a and 222b. The pull tab 240 can be attached to the latch body 230. Alternatively, the pull tab 240 can be monolithic with the latch body 230. The pull tab 240 can define a depth along the transverse direction T and a width along the lateral direction A that is greater than the depth. The pull tab 240 can extend out the second open end 203b of the housing and define a grip surface that can be easily gripped by a user such that a pull force in the rearward direction can be applied to the pull tab 240 that biases the pull tab 240 to move in the rearward direction against the spring force. The pull tab 240 can be snap fit into the latch body 230 or otherwise attached to the latch body 230 as desired. The latch assembly 220 can include any number of pull tabs 240 as desired.

The latch body 230 and the housing 203 can each define at least a first pair of complementary stop surfaces that prevent the latch assembly 220 from moving with respect to the housing 203 from the first position in the forward direction. The latch body 230 and the housing 203 can each define at least a second pair of complementary stop surfaces that prevent the latch assembly 220 from moving with respect to the housing 203 from the second position in the rearward direction. In one example, the latch body 230 can include a first body portion 230a and a second body portion 230b that is spaced from the first body portion 230a in the rearward direction. The pull tab 240 can be attached to the first body portion 230a. The at least one latch member 222 can extend out from the second body portion 230b. As described above, the latch body 230 can define a substantially flush outer surface 231a that is substantially flush with the outer surface 208a of the housing body 208. The substantially flush outer surface 231a can, for instance, be defined by the second body portion 2306. The first body portion 230a can likewise define a recessed outer surface 231b that, along with the substantially flush outer surface 231a, faces the upward direction. The recessed outer surface 231b can be downwardly recessed with respect to the substantially flush outer surface 231a. Thus, the recessed outer surface 231b can be disposed between the top wall 208a and the bottom wall 208b with respect to the transverse direction T.

As described above, the latch body 230 and the housing 203 can each define at least a first pair of complementary stop surfaces that prevent the latch assembly 220 from moving with respect to the housing 203 from the first position in the forward direction. The latch body 230 can define a first stop surface 261 of the first pair of stop surfaces. The first stop surface 261 can extend in the transverse direction T from the substantially flush outer surface 231a to the recessed outer surface 231b. The housing 203 can define a second stop surface 264 of the first pair of stop surfaces. The second stop surface 264 can be defined by a forwardmost surface of the housing body 208 that at least partially defines the window 234. During operation, the first and second stop surfaces 261 and 264 can abut when the latch assembly 220 is in the first position, thereby preventing the at least one spring member 250 from further urging the latch assembly 220 in the forward direction. It should be appreciated, of course, that the first and second stop surfaces 261 and 264 can be defined by any suitable respective surfaces of the latch assembly 220 and the housing 203 as desired.

Further as described above, the latch body 230 and the housing 203 can each define at least a second pair of complementary stop surfaces that prevent the latch assembly 220 from moving with respect to the housing 203 from the second position in the rearward direction. The latch body 230 can define a third stop surface 266 of the second pair of stop surfaces. The third stop surface 266 can extend in the transverse direction T and can face the rearward direction. The housing 203 can define a fourth stop surface 268 of the second pair of stop surfaces. The fourth stop surface 268 can extend in the transverse direction T and can face the forward direction. The at least one spring member 250 can extend over the fourth stop surface as it extends from the housing 203 to the latch body 203. During operation, the third and fourth stop surfaces 266 and 268 can abut when the latch assembly 220 is in the second position, thereby preventing a rearward force from pulling the latch body 203 rearward from the second position. It should be appreciated, of course, that the third and fourth stop surfaces 266 and 268 can be defined by any suitable respective surfaces of the latch assembly 220 and the housing 203 as desired.

One of the housing 203 and the latch body 230 can define at least one rail 270, and the other of the housing 203 and the latch body 230 can define a complementary at least one groove 272 that is configured to receive the at least one rail 270 so as to guide the latch body 230 as it moves between the first and second position relative to the housing 203. The first pair of stop surfaces can abut so as to prevent the latch body 203 from moving to a position forward from the first position. In this regard, the first pair of stop surfaces can prevent the at least one rail 270 from disengaging the complementary at least one groove 272. Similarly, the second pair of stop surfaces can abut so as to prevent the latch body 203 from moving to a position rearward from the second position. In this regard, the first pair of stop surfaces can prevent the at least one rail 270 from disengaging the complementary at least one groove 272. In one example, the housing 203 defines first and second rails 270, respectively, that are elongate in the longitudinal direction L. For instance, the first rail 270 can extend from the first side wall 208*c* in a direction toward the second side wall 208*d*, and the rail 270 can extend from the second side wall 208*d* in a direction toward the first side wall 208*c*. The latch body 230 can define first and second grooves 272, respectively, that are elongate in the longitudinal direction L. The first groove 272 can be sized to receive the first rail, and the second groove 272 can be sized to receive the rail 270, as the latch body 230 translates between the first and second positions.

The foregoing description is provided for the purpose of explanation and is not to be construed as limiting the invention. While various embodiments have been described with reference to preferred embodiments or preferred methods, it is understood that the words which have been used herein are words of description and illustration, rather than words of limitation. Furthermore, although the embodiments have been described herein with reference to particular structure, methods, and embodiments, the invention is not intended to be limited to the particulars disclosed herein. For instance, it should be appreciated that structure and methods described in association with one embodiment are equally applicable to all other embodiments described herein unless otherwise indicated. Those skilled in the relevant art, having the benefit of the teachings of this specification, may effect numerous modifications to the invention as described herein, and changes may be made without departing from the spirit and scope of the invention, for instance as set forth by the appended claims.

What is claimed:

1. An electrical connector module, comprising:
   an electrically conductive housing defining a first end and a second end spaced from the first end in a rearward direction, an inner surface that defines a housing interior that extends from the first end to the second end, and an outer surface opposite the inner surface, wherein the housing is configured to support a plurality of electrical conductors proximate to the first end, such that at least one cable mounted to a respective at least one of the plurality of electrical conductors extends through the housing interior and out the second end;
   at least one rail disposed within the electrically conductive housing; and
   a latch assembly slidably coupled to the at least one rail, the latch assembly comprising:
   1) at least one latch member movable from a first position to a second position that is displaced with respect to the first position in the rearward direction,
   2) at least one spring member having a first end operably coupled to the at least one latch member and a second end that is in abutment with the housing, the at least one spring member providing a spring force that biases the at least one latch member in a forward direction opposite the rearward direction, and
   3) a pull tab operably connected to the at least one latch member, wherein the pull tab extends out the second end in the rearward direction,
   wherein a force applied to the pull tab in the rearward direction causes the at least one latch member to move from the first position to the second position against the spring force, and removal of the applied force allows the spring force to cause the at least one latch member to translate in the forward direction from the second position to the first position.

2. The electrical connector module as recited in claim 1, wherein the housing defines an aperture that extends from the outer surface to the inner surface, and the at least one latch member extends into the aperture.

3. The electrical connector module as recited in claim 2, wherein the latch member is disposed in the aperture when the at least one latch member is in the second position.

4. The electrical connector module as recited in claim 3, wherein the latch member defines a ramp surface that extends along a direction from the outer surface toward the inner surface as it extends in the rearward direction.

5. The electrical connector module as recited in claim 4, wherein at least a portion of the ramp surface is offset from the aperture in a forward direction that is opposite the rearward direction when the latch member is in the first position.

6. A connector module, comprising:
   an electrically conductive housing defining a first end and a second end spaced from the first end in a rearward direction, an inner surface that defines a housing interior that extends from the first end to the second end, and an outer surface opposite the inner surface, wherein the housing is configured to support a plurality of electrical conductors proximate to the first end and to receive at least one cable at the second end such that signals are coupled between the cable and the plurality of electrical conductors through the housing; and a latch assembly within the housing, the latch assembly comprising:
1) at least one latch member movable from a first position to a second position that is displaced with respect to the first position in the rearward direction,
2) at least one spring member having a first end operably coupled to the at least one latch member and a second end that is in abutment with the housing, the at least one spring member providing a spring force that biases the at least one latch member in a forward direction opposite the rearward direction, and
3) a pull tab operably connected to the at least one latch member, wherein the pull tab extends out the second end in the rearward direction, wherein:
a force applied to the pull tab in the rearward direction causes the at least one latch member to move from the first position to the second position against the spring force, and removal of the applied force allows the spring force to cause the at least one latch member to translate in the forward direction from the second position to the first position; and
the at least one latch member comprises a first latch member and a second latch member, and the latch assembly further comprises a latch body that includes the first latch member and the second latch member.

7. The electrical connector module as recited in claim 6, wherein one of the housing and the latch defines at least one rail within the housing, and the other of the housing and the latch assembly defines a complementary at least one groove that is configured to receive the at least one rail so as to guide the latch assembly as it moves between the first and second positions.

8. The electrical connector module as recited in claim 7, further comprising at least one pair of stop surfaces that engage so as to prevent the latch assembly from moving to a position whereby the rail and grooves disengage from each other.

9. The electrical connector module as recited in claim 6, wherein the first and second latch members extend along a common wall of the housing.

10. The electrical connector module as recited in claim 6, wherein the latch body includes a support wall and first and second arms that extend out from opposite ends of the support wall, the first latch member projects from the first arm, and the second latch member projects from the second arm.

11. An electrical connector module, comprising:
an electrically conductive housing defining a first end and a second end spaced from the first end in a rearward direction, an inner surface that defines a housing interior that extends from the first end to the second end, and an outer surface opposite the inner surface, wherein the housing is configured to support a plurality of electrical conductors proximate to the first end, such that at least one cable mounted to a respective at least one of the plurality of electrical conductors extends through the housing interior and out the second end; and a latch assembly comprising:
1) at least one latch member movable from a first position to a second position that is displaced with respect to the first position in the rearward direction, wherein the at least one latch member comprises a first latch member and a second latch member, and the latch assembly further comprises a latch body that includes the first latch member and the second latch member,
2) at least one spring member having a first end operably coupled to the at least one latch member and a second end that is in abutment with the housing, the at least one spring member providing a spring force that biases the at least one latch member in a forward direction opposite the rearward direction, and
3) a pull tab operably connected to the at least one latch member, wherein the pull tab extends out the second end in the rearward direction, wherein:
a force applied to the pull tab in the rearward direction causes the at least one latch member to move from the first position to the second position against the spring force, and removal of the applied force allows the spring force to cause the at least one latch member to translate in the forward direction from the second position to the first position;
the latch body comprises first and second arms, and the first latch member projects from the first arm, and the second latch member projects from the second arm; and
each of the first and second arms ride along the inner surface of the housing as the latch member moves between the first and second positions.

12. The electrical connector module as recited in claim 11, wherein the at least one spring member comprises a spring finger that extends out from the latch member.

13. The electrical connector module as recited in claim 12, wherein the at least one spring member comprises a plurality of spring fingers spaced from each other along a lateral direction that is perpendicular to the rearward direction.

14. The electrical connector module as recited in claim 13, wherein the at least one spring member comprises a plurality of spring fingers spaced from each other along a transverse direction that is perpendicular to the rearward direction and the lateral direction.

15. The electrical connector module as recited in claim 14, wherein the at least one spring member includes at least one spring member that extends from the first arm of the latch body, and at least one spring member that extends from the second arm of the latch body.

16. The electrical connector module as recited in claim 15, wherein the at least one spring member comprises a coil spring that extends from the latch body to the housing.

17. The electrical connector module as recited in claim 16, wherein the housing further comprises a post that extends from the abutment surface in a forward direction opposite the rearward direction, and the coil spring receives the finger at the second end.

18. The electrical connector module as recited in claim 6, wherein the spring member comprises at least one spring finger that extends along the rearward direction and is bent along a transverse direction as it extends from the latch body, and the transverse direction is perpendicular to the rearward direction.

19. The electrical connector module as recited claim 18, wherein the pull tab extends from the latch body at a location whereby a substantially flush outer surface of the latch body is substantially flush with the housing.

20. The electrical connector module as recited in claim 19, wherein the latch body defines a recessed outer surface that is spaced from the substantially flush outer surface in the forward direction, and the recessed outer surface is recessed with respect to the substantially flush outer surface in a direction from the outer surface toward the inner surface.

* * * * *